United States Patent
Goetz et al.

(10) Patent No.: US 9,891,900 B2
(45) Date of Patent: *Feb. 13, 2018

(54) GENERATION OF SPECIALIZED METHODS BASED ON GENERIC METHODS AND TYPE PARAMETERIZATIONS

(71) Applicant: Oracle International Corporation, Redwood City, CA (US)

(72) Inventors: Brian Goetz, Williston, VT (US); John R. Rose, San Jose, CA (US); Maurizio Cimadamore, Dublin (IE)

(73) Assignee: Oracle International Corporation, Redwood City, CA (US)

( * ) Notice: Subject to any disclaimer, the term of this patent is extended or adjusted under 35 U.S.C. 154(b) by 14 days.

This patent is subject to a terminal disclaimer.

(21) Appl. No.: 15/055,469

(22) Filed: Feb. 26, 2016

(65) Prior Publication Data

US 2016/0202961 A1 Jul. 14, 2016
US 2017/0364339 A9 Dec. 21, 2017

Related U.S. Application Data

(63) Continuation-in-part of application No. 14/660,177, filed on Mar. 17, 2015, now Pat. No. 9,772,828, and
(Continued)

(51) Int. Cl.
*G06F 9/45* (2006.01)
*G06F 9/44* (2006.01)
*G06F 9/455* (2006.01)

(52) U.S. Cl.
CPC .............. *G06F 8/447* (2013.01); *G06F 8/41* (2013.01); *G06F 8/76* (2013.01); *G06F 9/443* (2013.01); *G06F 9/45516* (2013.01)

(58) Field of Classification Search
CPC ....................................................... G06F 8/447
(Continued)

(56) References Cited

U.S. PATENT DOCUMENTS 5,628,016 A 5/1997 Kukol
5,677,312 A 10/1997 Kon et al.
(Continued)

FOREIGN PATENT DOCUMENTS

WO 2004102303 11/2004

OTHER PUBLICATIONS

Sheard, "Generic Unification via Two-Level Types and Parameterized Modules", ACM, pp. 86-97, 2001.*
(Continued)

*Primary Examiner* — Anil Khatri
(74) *Attorney, Agent, or Firm* — Robert C. Kowert; Meyertons, Hood, Kivlin, Kowert & Goetzel, P.C.

(57) ABSTRACT

Generic method specialization represents the ability to specialize generic methods over various types. When implementing generic method specialization an annotated class file may include a generic method declaration that is annotated with specialization metadata indicating elements of the generic method to be adjusted during specialization. The annotated method may be usable directly as an erased method implementation (e.g., to load the method when instantiated with reference types) and may also be usable as a template for specialization. When a generic method is being prepared for execution, such as when it is first invoked during runtime, a specialization method generator function may be used to specialize the generic method based on the specialization metadata in the generic method declaration. The specialization method generator function may use the annotated generic method declaration as a template for specialization.

20 Claims, 16 Drawing Sheets

Related U.S. Application Data a continuation-in-part of application No. 14/692,590, filed on Apr. 21, 2015, now Pat. No. 9,678,729, and a continuation-in-part of application No. 14/692,592, filed on Apr. 21, 2015, now Pat. No. 9,524,152, and a continuation-in-part of application No. 14/692,601, filed on Apr. 21, 2015, now Pat. No. 9,483,242, and a continuation-in-part of application No. 14/660,143, filed on Mar. 17, 2015, now Pat. No. 9,785,456.

(60) Provisional application No. 61/982,802, filed on Apr. 22, 2014.

(58) Field of Classification Search
USPC .................................................. 717/140–151
See application file for complete search history.

(56) References Cited

U.S. PATENT DOCUMENTS

| | | | |
|---|---|---|---|
| 5,923,878 A | 7/1999 | Marsland | |
| 6,279,008 B1 | 8/2001 | Tung Ng et al. | |
| 6,360,360 B1 | 3/2002 | Bates et al. | |
| 6,484,313 B1* | 11/2002 | Trowbridge | G06F 8/447 717/146 |
| 6,513,152 B1 | 1/2003 | Branson et al. | |
| 6,560,774 B1* | 5/2003 | Gordon | G06F 9/44589 717/114 |
| 6,757,890 B1 | 6/2004 | Wallman | |
| 7,000,219 B2 | 2/2006 | Barrett et al. | |
| 7,127,709 B2* | 10/2006 | Demsey | G06F 9/45516 707/999.202 |
| 7,162,716 B2 | 1/2007 | Glanville et al. | |
| 7,240,327 B2* | 7/2007 | Singh | G06F 8/30 709/218 |
| 7,243,346 B1* | 7/2007 | Seth | G06F 9/445 717/162 |
| 7,340,728 B2* | 3/2008 | Kutter | G06F 17/30908 707/E17.122 |
| 7,380,242 B2* | 5/2008 | Alaluf | G06F 8/447 717/148 |
| 7,444,644 B1* | 10/2008 | Slaughter | G06F 9/547 717/136 |
| 7,493,605 B2* | 2/2009 | Alaluf | G06F 8/52 717/136 |
| 7,496,908 B2* | 2/2009 | DeWitt, Jr. | G06F 8/443 717/154 |
| 7,634,763 B2* | 12/2009 | Wain | G06F 8/20 717/140 |
| 7,669,193 B1* | 2/2010 | Chipman | G06F 8/433 717/146 |
| 7,716,630 B2* | 5/2010 | Wholey | G06F 8/34 345/619 |
| 7,844,958 B2* | 11/2010 | Colton | G06F 8/52 717/146 |
| 8,079,023 B2 | 12/2011 | Chen | |
| 8,250,528 B2 | 8/2012 | Meijer et al. | |
| 8,438,551 B2 | 5/2013 | Tonkin et al. | |
| 8,572,138 B2* | 10/2013 | Sundar | G06F 8/60 707/828 |
| 8,776,031 B1* | 7/2014 | Goodwin | G06F 9/44521 704/2 |
| 8,863,079 B2 | 10/2014 | Darcy et al. | |
| 8,959,501 B2* | 2/2015 | Eidt | G06F 8/20 717/136 |
| 9,075,667 B2* | 7/2015 | Torgersen | G06F 8/54 |
| 9,170,908 B2* | 10/2015 | Gluck | G06F 11/3636 |
| 9,411,560 B2* | 8/2016 | Darcy | G06F 8/37 |
| 2002/0032900 A1 | 3/2002 | Charisius et al. | |
| 2003/0018958 A1 | 1/2003 | Wallman et al. | |
| 2003/0079049 A1 | 4/2003 | Sokolov | |
| 2003/0079201 A1 | 4/2003 | Sokolov | |
| 2004/0006762 A1 | 1/2004 | Stewart et al. | |
| 2004/0221228 A1 | 11/2004 | Day et al. | |
| 2005/0055682 A1 | 3/2005 | Gadre et al. | |
| 2005/0193269 A1 | 9/2005 | Haswell et al. | |
| 2006/0048024 A1 | 3/2006 | Lidin et al. | |
| 2006/0143597 A1 | 6/2006 | Alaluf | |
| 2006/0251125 A1 | 11/2006 | Goring et al. | |
| 2007/0256069 A1 | 11/2007 | Blackman et al. | |
| 2008/0033968 A1 | 2/2008 | Quan et al. | |
| 2008/0040360 A1 | 2/2008 | Meijer et al. | |
| 2008/0257910 A1 | 10/2008 | Chang | |
| 2008/0294740 A1 | 11/2008 | Grabarnik et al. | |
| 2009/0271771 A1 | 10/2009 | Fallows | |
| 2010/0223606 A1 | 9/2010 | Park et al. | |
| 2011/0067013 A1 | 3/2011 | Frost et al. | |
| 2012/0005660 A1 | 1/2012 | Goetz et al. | |
| 2013/0305230 A1 | 11/2013 | Inoue | |

OTHER PUBLICATIONS

Ernst, "Inheritance versus Parameterization", ACM, pp. 26-29, 2013.*

Cheung et al, "Metadata Management and Relational Databases", ACM, pp. 227-232, 2005.*

Wickett et al, "The Logical Form of the Proposition Expressed by a Metadata Record", ACM, pp. 413-414, 2012.*

He et al, "Parameterizing Subdivision Surfaces", ACM Transactions on Graphics, vol. 29, No. 4, Article 120, pp. 1-6, 2010.*

Belizki et al, "Application Independent Metadata Generation", ACM, pp. 33-36, 2006.*

Mouza et al, "Efficient Evaluation of Parameterized Pattern Queries", ACM, pp. 728-735, 2005.*

Paynter, "Developing Practical Automatic Metadata Assignment and Evaluation Tools for Internet Resources", ACM, pp. 291-300, 2005.*

International Search Report and Written Opinion from PCT/US2015/026966, dated Sep. 1, 2015, Oracle International Corporation, pp. 1-11.

Martin J. Cole, et al., "Dynamic compilation of C++ template code", Scientific Programming vol. 11, No. 4, Jan. 1, 2003, pp. 321-327.

Eyvind W. Axelsen, et al., "Groovy Package Templates", Proceeding of the 5th Symposium on Dynamic Languages, Oct. 26, 2009, pp. 15-26.

Lubomir Bourdev, et al., "Efficient run-time dispatching in generic programming with minimal code bloat", Science of Computer Programming, vol. 76, No. 4, Apr. 1, 2011, pp. 243-257.

Brian Goetz, "ClassDynamic Jun. 2014: Initial Draft", Retrieved from the Internet: URL: http://web.archive.org/web/20140801102025/http://cr.openjdk.java.net/briangoetz/valhalla/spec-classdyn.html, Jun. 2014, pp. 1-3.

International Search Report and Written Opinion from PCT/US2015/026947, dated Jul. 6, 2015, Oracle International Corporation, pp. 1-11.

Eric Allen, et al., "Efficient Implementation of Run-Time Generic Types for Java", Mar. 3, 2006, Retrieved from the Internet: URL: http://web.archive.org/web/20060303102205/http://www.cs.rice.edu/javaplt/paper/wcgp2002.pdf, pp. 1-28.

Robert Cartwright, et al., "Compatible Genericity with Run-Time Types for the Java Programming Language", Principles of Programming Languages, ACM, Oct. 1, 1998, pp. 201-215.

Joseph A. Bank, et al., "Parameterized Types and Java", May 1996, Retrieved from the Internet: URL: http://publications.csail.mit.edu/lcs/pubs/pdf/MIT-LCS-TM-553.pdf, pp. 1-19.

Sunil Soman, et al., "Efficient and General On-Stack Replacement for Aggressive Program Specialization", 2006 International Conference on Programming Languages and Compilers (PLC'06), Jun. 26-29, pp. 1-9, Las Vegas, NV.

"Design Pattern Instantiation Directed by Concretization and Specialization"—Peter Kajsa—ComSIS vol. 8, No. 1, Jan. 2011 (DOI:10.2298/CSIS091212032K), pp. 1-32.

"Common Language Infrastructure (CLI) Partitions I to VI," 6th Edition / Jun. 2012, ECMA International, Standard ECMA-335, pp. 1-574.

(56) References Cited

OTHER PUBLICATIONS

International Search Report and Written Opinion from PCT/US2015/026965, Oracle International Corporation, dated Nov. 6, 2015, pp. 1-11.
Gamma E et al: "Design Patterns: Elements of Reusable Object-Oriented Software", Sep. 1, 1999, pp. 81-228, XP882287989, p. 175-p. 184.
Julian Dragos et al: "Compiling generics through user-directed type specialization", Proceedings of the 4th Workshop on the Implementation, Compilation, Optimization of Object-Oriented Languages and Programming Systems, ICOOOLPS '09, Jul. 6, 2009 (Jul. 6, 2009), pp. 42-47, XP055195664, New York, New York, USA DOI: 10.1145/1565824.1565830, ISBN: 978-1-60-558541-3, p. 43-p. 46.
Martin Buchi et al: "Generic Wrappers" In: "Advances in Communication Networking: 20th EUNICE/IFIP EG 6.2, 6.6 International Workshop, Rennes, France, Sep. 1-5, 2014, Revised Selected Papers", May 12, 2000 (May 12, 2000), Springer Verlag, DE 032548, XP055223226, ISSN: 0302-9743, ISBN: 978-3-642-36699-4, vol. 1850, pp. 201-225, DOI: 10.1007/3-540-45102-1 10, p. 202-p. 219.
Evered M et al: "Genja-a new proposal for parameterised types in Java", Technology of Object-Oriented Languages and Systems, 1997. Tools 25, Proceedings Melbourne, Vic., Australia Nov. 24-28, 1997, Los Alamitos, CA, USA,IEEE Comput. Soc, US, Nov. 24, 1997 (Nov. 24, 1997), pp. 181-193, XP010286322, ISBN: 978-0-8186-8485-2 p. 182-p. 188.
Gilad Bracha, "Generics in the Java Programming Language", Jul. 5, 2004, pp. 1-23.
Michael Johnson, "New Features of C#", CSCI 5448, 2012, p. 5.
Alessandra Warth, et al., "Statically Scoped Object Adaptation with Expanders", ACM OOPSLA'06, Oct. 22-26, 2006, pp. 1-19.
International Search Report and Written Opinion in PCT/US2015/026962, dated Jul. 2, 2015, Oracle International Corporation, pp. 1-12.
Andrew Myers, et al., "Parameterized Types for Java", Conference Record of POPL '97: 24th ACM SIGPLANSIGACT Symposium on Principles of Programming Language, Jan. 15-17, 1997, pp. 132-145.
Atanas Radenski, et al., "The Java 5 Gererics Comprise Orthogonality to Keep Compatibility", Journal of Systems & Software, Nover 1, 2008, pp. 2069-2078, vol. 81, No. 11.
Brian Goetz, "State of the Specialization", Retrieved from the Internet: http://web.archive.org/web/20140717190322/http://cr.openjdk.java.net/briangoetz/valhalla/specialization.html, pp. 1-7.
"Templates, C++ FAQ", Jan. 15, 2014, Retrieved from the Internet: URL:http://web.archive.org/web/20140115082944/http://isoccp.org.wiki/faq/templates, pp. 2-27.
U.S. Appl. No. 14/660,143, filed Mar. 17, 2015, Brian Goetz et al.
U.S. Appl. No. 14/660,177, filed Mar. 17, 2015, Brian Goetz et al.
U.S. Appl. No. 14/660,604, filed Mar. 17, 2015, Brian Goetz et al.
U.S. Appl. No. 14/692,590, filed Apr. 21, 2015, Brian Goetz et al.
U.S. Appl. No. 14/692,592, filed Apr. 21, 2015, Brian Goetz et al.
U.S. Appl. No. 14/692,593, filed Apr. 21, 2015, Brian Goetz et al.
U.S. Appl. No. 14/692,601, filed Apr. 21, 2015, Brian Goetz et al.
International Search Report and Written Opinion from PCT/US2015/026964, dated Jul. 1, 2015, Oracle International Corporation, pp. 1-11.
Nicolas Stucki, et al., "Bridging Islands of Specialized Code using Macros and Reified Types", Proceedings of the 4th Workshop on SCALA, Jan. 2013, pp. 1-4.
Nystrom et al., "Genericity through Constrained Types", 2009, IBM Watson Research Center, 18 pages.
Shailendra Chauhan, "Difference Between Generalization and Specialization", 2013, retrieved from http://www.dotnet-tricks.com/Tutorial/oops/169c211013-Difference-Between-Generalization-and-Specialization.html, 6 pages.
Kiezun et al., "Refactoring for Parameterizing Java Classes", IEEE, 2007, pp. 1-10.
Ernst, "Inheritance versus Parameterization", ACM, 2013, pp. 26-29.

* cited by examiner

GENERATION OF SPECIALIZED METHODS BASED ON GENERIC METHODS AND TYPE PARAMETERIZATIONS

PRIORITY INFORMATION

This application is a continuation-in-part of U.S. patent application Ser. No. 14/660,143 filed Mar. 17, 2015 titled Metadata-driven Dynamic Specialization, which claims priority to U.S. Provisional Application Ser. No. 61/982,802 filed Apr. 22, 2014 titled Specializing Parametric Types with Primitive Type Arguments, both of which are hereby incorporated by reference in their entirety.

This application is a continuation-in-part of U.S. patent application Ser. No. 14/660,177 filed Mar. 17, 2015 titled Structural Identification of Dynamically Generated, Pattern-Based Classes, which claims priority to U.S. Provisional Application Ser. No. 61/982,802 filed Apr. 22, 2014 titled Specializing Parametric Types with Primitive Type Arguments, both of which are hereby incorporated by reference in their entirety.

This application is a continuation-in-part of U.S. patent application Ser. No. 14/692,590 filed Apr. 21, 2015 titled Dependency-driven Co-Specialization of Specialized Classes, which claims priority to U.S. Provisional Application Ser. No. 61/982,802 filed Apr. 22, 2014 titled Specializing Parametric Types with Primitive Type Arguments, both of which are hereby incorporated by reference in their entirety.

This application is a continuation-in-part of U.S. patent application Ser. No. 14/692,592 filed Apr. 21, 2015 titled Partial Specialization of Generic Classes, which claims priority to U.S. Provisional Application Ser. No. 61/982,802 filed Apr. 22, 2014 titled Specializing Parametric Types with Primitive Type Arguments, both of which are hereby incorporated by reference in their entirety.

This application is a continuation-in-part of U.S. patent application Ser. No. 14/692,601 filed Apr. 21, 2015 titled Wholesale Replacement of Specialized Classes, which claims priority to U.S. Provisional Application Ser. No. 61/982,802 filed Apr. 22, 2014 titled Specializing Parametric Types with Primitive Type Arguments, both of which are hereby incorporated by reference in their entirety.

BACKGROUND

The present invention relates generally to software development and more specifically to various aspects of language development within any of various programming languages, such as a platform-independent, object-oriented programming language, as one example.

In various programming languages, parametric polymorphism (e.g., generics) may be considered as a way to make a language more expressive, while still maintaining full static type-safety. Parametric polymorphism may allow a function or a data type to be written in a generic fashion such that it can handle various data types in the same manner regardless of their different types. Such functions and data types may be called generic functions and generic datatypes. For example, a generic method may be written <T> makeList (T t1, T t2), which means that it can take as parameters elements of any type T, where T is specified separately from the specification of makeList.

Sometimes, when using a platform-independent, object oriented language, one cannot generify over primitive types without boxing (e.g., automatically converting a value of a primitive type like int into an object of a corresponding wrapper class like Integer).

Parametric polymorphism (generics) may also involve a tradeoff between code size, generation costs and type specificity. For example, a programming language may support primitive-specialized generics, but may generate specialized classes statically, possibly at potentially increased cost to code footprint and compilation cost. Another programming language may use a templatized bytecode format, while only performing specialization at runtime, which may require an additional step before using a generic class file, thereby potentially harming startup performance.

SUMMARY

Generic method specialization may include the ability to specialize generic methods over reference and non-reference types, as well as other types. When implementing generic method specialization, such as may be applied to a platform independent object-oriented programming language, a generic method declaration may be generated that includes with specialization metadata indicating one or more portions (e.g., program elements) of the generic method that may need to be adjusted during specialization.

When a generic method is being prepared for execution, such as when it is first invoked, a specialization method generator function may be used to specialize the generic method based on the specialization metadata (e.g., annotations) in the generic method declaration as well as the type specialization information at the call site. In some embodiments, specialization may be considered as having two parts—the class/method declaring how it can be specialized and the instantiation/call site providing instantiated values for some (or all) of the specializable type parameters. Additionally, the annotated generic method declaration may represent a pre-instantiated version of the most (or at least a more) common interpretation of the generic method. For example, the annotated generic method declaration may be loadable and invocable as a particular instantiation (e.g., specialization) of the generic method.

The specialization of generic methods may also include only partially specializing a generic method to create a partially specialized method that may be subsequently specialized further, according to some embodiments. In other embodiments, specializing one method (or other type) may trigger the specialization of one or more other generic methods (or other types).

DETAILED DESCRIPTION OF EMBODIMENTS

Figure 1:
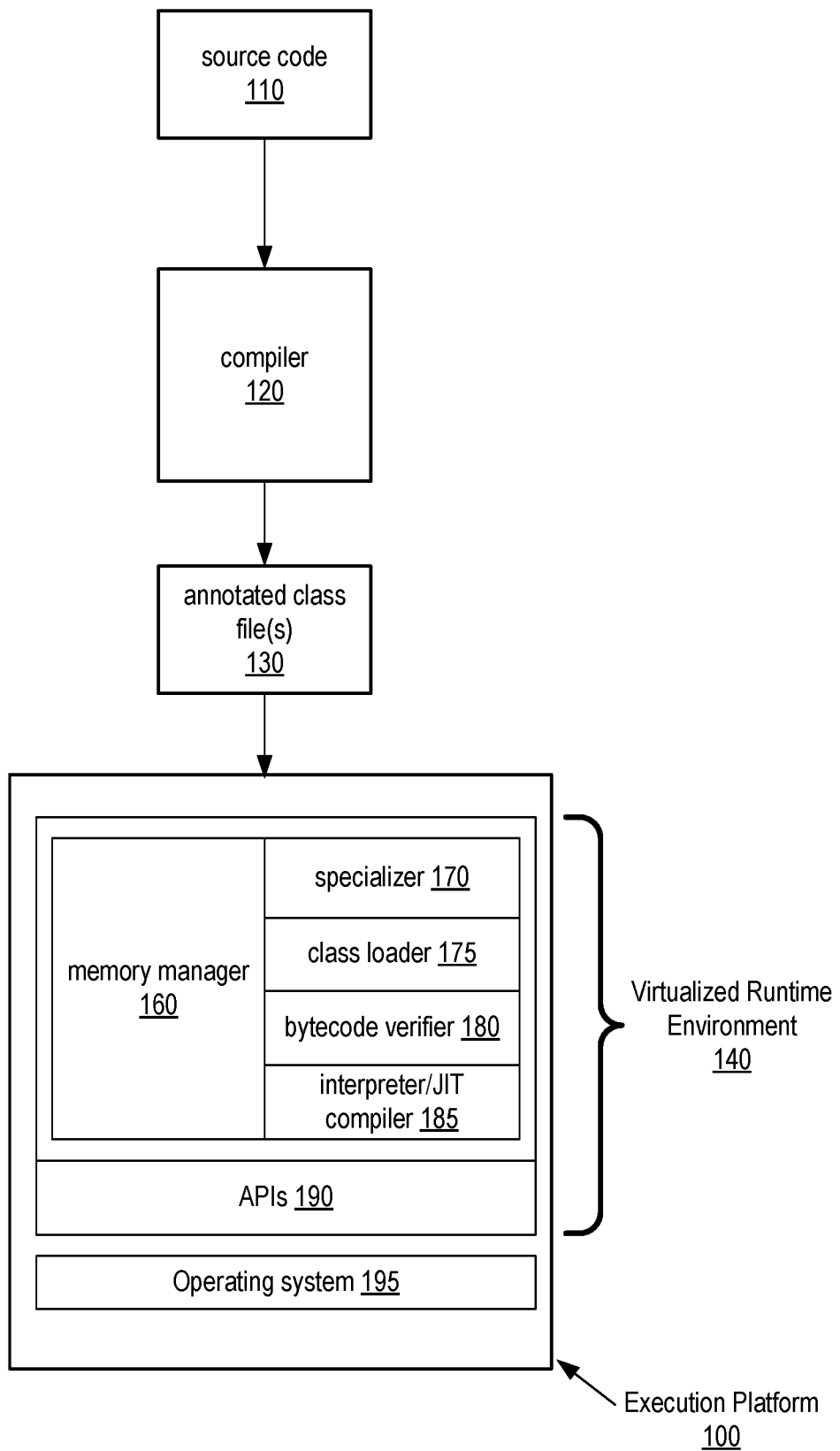
FIG. 1 is a logical block diagram illustrating component of a system implementing the specialization of generic methods, according to one embodiment.

Described herein are various embodiments of enhancements to software development using a platform-independent, object oriented language, such as the Java™ programming language, to support various features, such as (for example) generic method specialization. The specialization of generic methods may include generating an annotated class file that may be used in multiple ways, according to different embodiments. For example, a method in an annotated class file may be usable directly, but may also be used as a template during specialization. A compiler may include specialization metadata in an annotated class file. For instance, one or more program elements may be marked (e.g., annotated, decorated, etc.) with specialization information to indicate that they may need to be adjusted during specialization.

The metadata in an annotated class file may include specialization metadata indicating type variables (e.g., program elements) that have been erased and types that are the erasures of type variables. The specialization metadata may not prevent methods in the annotated class file from being used directly (e.g., loading, linking and invoking the method). For example, if all type-variable bindings point to reference types, the annotated class may be usable without specialization. If, however, at least one type-variable binding points to a primitive type (e.g., int, Boolean, user-defined value type, etc.) then specialization may be used (or required). Thus, a generic type parameter may be allowed to range over the unbounded set of virtually all types (e.g., over a set of types which includes at least one type which is not a reference, such as int), according to some embodiments.

In the following detailed description, numerous specific details are set forth to provide a thorough understanding of claimed subject matter. However, it will be understood by those skilled in the art that claimed subject matter may be practiced without these specific details. In other instances, methods (e.g., techniques), apparatuses and/or systems are not described in detail below because they are known by one of ordinary skill in the art in order not to obscure claimed subject matter.

While various embodiments are described herein by way of example for several embodiments and illustrative drawings, those skilled in the art will recognize that embodiments are not limited to the embodiments or drawings described. It should be understood that the drawings and detailed description thereto are not intended to limit the embodiments to the particular form disclosed, but on the contrary, the intention is to cover all modifications, equivalents and alternatives falling within the spirit and scope of the disclosure. Any headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Turning now to FIG. 1 which illustrates a workflow for compiling and executing a computer program specified in a high-level, platform independent, object-oriented language that supports primitive and reference data types, and various techniques, mechanisms, methods, features and enhancements regarding generic method specialization as described herein, according to various embodiments. For purposes of illustration, the following description is provided largely in the context of using the Java™ programming language. However, it is noted that the techniques described may be used with virtually any object-oriented programming language that supports multiple kinds of types (such as primitive types, reference types, record types, union types, etc.) and specialization thereof in appropriate contexts.

According to the illustrated embodiment, the workflow may begin when a compiler, such as compiler 120, receives source code for a computer program, such as source code 110. In various embodiments, source code 110 may be specified in various high-level and/or platform independent, object-oriented programming languages, such as Java™ and/or other languages. For example, source code may be provided as a set of .java files in embodiments where Java™ is being used. In some embodiments, source code 110 may be specified using a combination of languages, which may include one or more low-level and/or intermediate languages (e.g., assembly). In some embodiments, at least some of the source code may initially be written in a dynamically-typed high-level language, such as Python or Ruby, while in other embodiments, all of the source code may be in a statically-typed language such as Java™.

In general, a class may be considered a user-defined type or data structure that may include data, variables, functions, methods (i.e., programmatic methods) and/or other attributes as members and that represents a definition, blueprint, or template, for creating programming objects of a specific type. A class may provide initial values for data members and implementations for member functions and methods. Classes are frequently included in libraries. A library may be considered a collection of resources used by software programs or applications. For instance, a library may include any of various types of resources including, but not limited to: data, documentation, classes, subroutines, and/or type specifications, according to some embodiments. A library may be organized so as to be utilized by more than one application (possibly at the same time), and may promote re-usability by providing resources so that applications may not have to implement (or re-implement) the same behavior.

The compiler 120 may analyze the source code 110 to produce an executable version of the program or bytecode files, such as annotated class file(s) 130 (e.g., .class files or .jar files in the case of Java™) in the depicted embodiment. Source code 110 may represent one or more individual files including source code written in one or more programming languages. Different types of executable code formats may be used in various embodiments; for example, binary machine language may be used instead of bytecodes. In some scenarios, parts of the executable code (e.g., annotated class files 130) may be in bytecode while others are in a native binary machine language.

As part of compiling program source code 110 into executable code (e.g., annotated class files 130), the compiler 120 may perform a sequence of analysis operations and generate various intermediate data structures before generating the executable version, such as to apply or implement generic method specialization, according to some embodiments. For example, the compiler may apply a type erasure operation using an encoded (annotated or decorated with specialization metadata) form of a program element in a generic method, thus creating annotated class file 130. An encoded form of the program element may include metadata indicating which type variables (e.g., program elements) of the method (or class) have been erased and which types are the erasures of type variables.

Additionally, the specialization metadata may include any of various types of specialization-related information. For instance, in some embodiments generic method specialization may involve the specialization of various elements including, but not limited to, method interfaces, class interfaces, data descriptions (e.g., data fields), and/or machine instructions (e.g., bytecodes). Thus, in one example the specialization metadata may indicate that an instruction operates on values of type variables, values of reference types, and/or method or class declarations. Similarly, the specialization metadata may indicate that an argument indicates one or more types that are erasures of the type variables of the method or class declaration.

In some embodiments, compiler 120 may retain certain types of information that traditionally may not have been retained during the compilation process. For example, in one embodiment, compiler 120 may retain information utilized as part of performing an erasure. The compiler may include (at least part of) such information in the annotated class file 130 as specialization metadata. For instance, a type erasure operation may be applied using an encoded (or annotated) form of a program element in a generic method. The program element may represent a method signature or declaration, a class signature or declaration, an instruction, an argument to an instruction, as well as virtually any program element that represents, moves, or manipulates data.

The encoded form of the program element may include specialization metadata indicating which type variables (e.g., program elements) of the generic method (or class) declaration have been erased and which types are the erasures of type variables. Additionally, the metadata may include various types of specialization-related information. For example, the metadata may indicate that an instruction operates on values of the type variables of a generic method (or class) declaration. Similarly, the metadata may indicate that an argument indicates types that are erasures of the type variables of the generic method (or class) declaration.

When implementing generics with erasure, such as in the Java™ programming language, the compiler may need to infer the particular instantiation of a generic method's type parameters. In general, there may be two parts to a specialized method call. Firstly, there is the method itself, which may identify one or more specializable parameters and secondly, there is the call site, which may provide the instantiation of those parameters. In some embodiments, they may be in separate class files or modules, and may frequently be compiled separately from the method being invoked. Alternatively, the programmer or developer may directly provide such information in source code 110. The compiler may then perform various type checking and erase everything (e.g., all types) to less specific type information. Traditionally, a compiler would generally not retain the results of type checking and erasure. However, when implementing the specialization of generic methods as described herein, that information (e.g., the results of performing type checking and erasures) may be retained for at least some instantiations. Thus, when a callsite (e.g., the location of generic method invocation) is linked, the virtualized runtime environment may determine that a particular instantiation of a generic method may have to be generated and installed into the class of the generic method prior to calling the particular instantiation.

As noted above, the specialization metadata in an annotated class file may include specialization information indicating which type variables have been erased and which types are the erasures of type variables, according to some embodiments. Type erasure pertains to the use of generics within a programming language (e.g., the Java™ programming language). When performing a type erasure operation, a compiler may be configured to replace all type parameters in generics types with their bounds or with an Object type if the type parameters are unbounded. The generated bytecode may thus contain only ordinary classes, interfaces and methods.

As illustrated in FIG. 1, annotated class file 130 may be passed to an execution environment, such as virtualized runtime environment 140, which executes the code on an execution platform 100, thereby creating various output data and/or behavior. The virtualized runtime environment 140 may in turn comprise a number of different components, such as memory manager 160, specializer 170, class loader 175, bytecode verifier 180 (e.g., to check the validity of the executable code), and/or an interpreter and/or just-in-time (JIT) compiler 185, according to various embodiments. The JIT compiler may in some embodiments be responsible for translating some or all of the bytecode (for example, heavily-used portions of bytecode) into platform-specific machine code to improve performance of the program execution. A virtualized runtime environment 140 may also include code to implement a number of application programming interface (API) libraries 190 in some embodiments. The virtualized runtime environment 140 may run on top of lower-level software such as an operating system 195 in some embodiments. In some embodiments, virtualized runtime environment 140 may be a platform-independent, object-oriented, runtime environment, such as a Java™ virtual machine in one example embodiment.

In different embodiments, the output or behavior produced as a result of the execution of the compiled code may include data stored in various levels of system memory (e.g., in-memory objects and/or data structures), on persistent storage (e.g., files on a file system), etc. The behavior may also include various program functionalities, such as displaying output on a screen, sending messages over a network, and/or otherwise interacting with various users and/or components.

In some embodiments, virtualized runtime environment 140 may specialize generic methods using the annotated class file(s) 130 generated by compiler 120. According to some embodiments, when preparing a method for execution that needs to be specialized for a particular type parameterization, virtualized runtime environment 140 may use (the method declaration within) annotated class file 130 as a template, along with the type parameters with which to specialize, to produce a specialized version of the method which is the particular specialization of the method being specialized.

For example, the method declaration:
    static<any T>List<T>makeList(T t1, T t2)
may be specialized using T=int to obtain:
    static int List<int>makeList(int, int).

In general, annotated class file 130 may be considered a class file marked up with specialization metadata that includes any of various types of specialization information. Furthermore, an annotated generic method may be considered a method declaration (e.g., such as within annotated class file 130) that may be used as a template (e.g., an erased method implementation) to generate new methods that are specializations of the annotated generic method but which may also be used directly as a loadable, linkable and invocable method, according to various embodiments.

For example, the following example code illustrates a static generic method:

```
static<any T> List<T> makeList(T t1, T t2) {
    List<T> list = new ArrayList<T>( );
    list.add(t1);
    list.add(t2);
    return list;
}
```

If the above example makeList method is invoked with T=int, as shown below:
    List<int>list=Util.<int>makeList(3, 4);
a version of makeList that is specialized to T=int may be invoked. In some embodiments, the explicit type int is elided, and the compiler may infer it, as shown below:
    List<int>list=Util.makeList(3, 4);

In the above example, makeList is a static method that is generic in any T. MakeList takes two parameters of type T and produces a List<T> containing those parameters. According to some embodiments, a compiler may generate an erased class file enhanced with specialization metadata indicating the program elements within the makeList method that may need to be adjusted when specializing the method for particular type parameterizations. In another embodiment, however, the compiler may produce both an erased class file and an annotated class file that includes a template method (e.g., that includes the specialization metadata). In yet another embodiment, the compiler may generate just an annotated class file (e.g., that includes a template method) from which an erased class file may be generated.

Alternatively, if makeList were to be specialized for a reference type, such as T=String, ArrayList may also be specialized for the reference type. In some embodiments, specializing makeList for reference types (e.g., object types) may involve converting T to Object. However, in some embodiments, specializing makeList for T=String may involve specializing ArrayList for String, thus converting the underlying Object[ ] into a String[ ] rather than erasing String to Object (e.g., as the Java programming language does).

In some embodiments, specializable program elements, such as method and classes, may be described not only nominally, but also by structural descriptions. A structural description may be a combination of a specialized method generator function and parameters to that specialized method generator. Thus, a structural description may be considered to extend the way classes and/or methods are described within a runtime environment. The specialized method generator may be configured to generate specialized versions of specializable program elements based upon structural descriptions. For example, a structural description for a generic class may include a reference to a pattern (e.g., specialized method generator) either by name or by reference to a class or method that implements it, as well as the parameters to the pattern. Similarly, a generic method may be generated by applying a pattern to a generic method template, such as an annotated erased generic method declaration. Thus, in some embodiments, a structural description may include an identification of a specialization generator function, such as a reference to a pattern (e.g., by name or by reference to a class or method that implements it) and the parameters, if any, for the generator function (e.g., parameters to the instantiation of the pattern).

Figure 2:
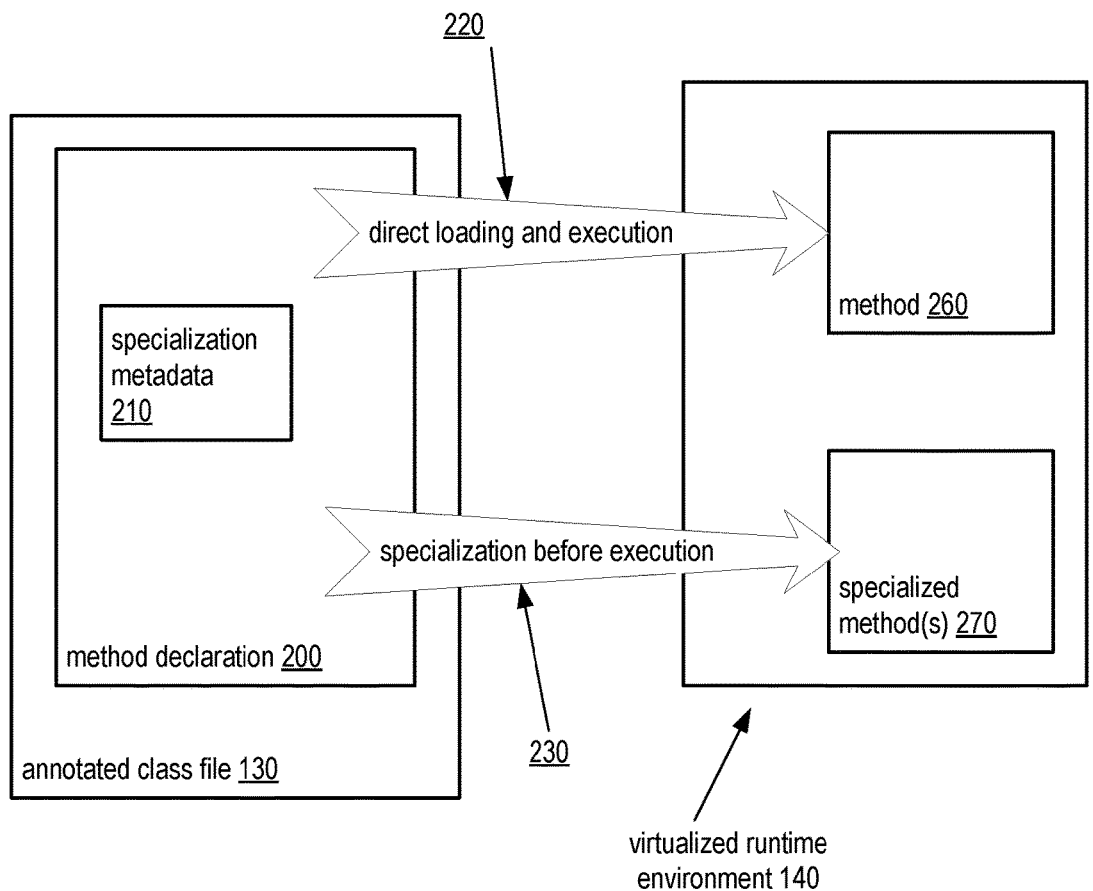
FIG. 2 is a logical block diagram illustrating the specialization of generic methods, as in one embodiment.

As noted above, an annotated generic method declaration in an annotated class file may be usable directly (e.g., to load, link, invoke and execute the method in situations where its type variables are erased) and as a template for generating specializations of the method. FIG. 2 is a logical block diagram illustrating the specialization of generic methods, according to one embodiment. In some embodiments, class file 130 may include a method declaration 200, that may be an erased generic method that is directly usable as an executable method (e.g., a method that can be loaded, invoked, linked and executed as is, but that may also be suitably annotated, such as by including specialization metadata 210, so that it may be used as a template to generate specialized versions of that method.

For example, as illustrated in FIG. 2, method declaration 200 that may include specialization metadata 210 (and/or other specialization information) usable by virtualized runtime environment 140 to generate one or more specialized method(s) 270, as indicated by arrow 230. For instance, virtualized runtime environment 140 may be configured to utilize specialization metadata 210 in order to execute a specialization generator function on method declaration 200 to generate a specialized version of the method for a particular type parameterization (e.g., specialized method 270). In other embodiments, however, method declaration 200 may be specialized without the use of, and/or within including any specialization metadata within the actual method declaration.

Additionally, method declaration 200 (including specialization metadata 210) may also be directly usable, such as to load, link, invoke and execute method 260, without requiring any dynamic specialization when preparing the method for execution, as indicated by arrow 220. For instance, in some embodiments method declaration 200 may include specialization metadata 210 (e.g., or other specialization information) structured such that virtualized runtime environment 140 thus may be able to ignore the annotations (e.g., specialization metadata 210) and use method declaration 200 in a traditional manner to load, invoke and/or execute method 260 (e.g., invoking the method using invokevirtual, invokeinterface or invoke static instructions in a Java™ based embodiment) from method declaration 200.

As a further example, method declaration 200 may include an annotated aload instruction. Virtualized runtime environment 140 may identify the annotated aload as a traditional aload instruction and execute it in the normal fashion when method declaration 200 does not need to be specialized. However virtualized runtime environment 140 may utilize the annotated instruction to perform specialization when preparing method declaration 200 for execution. In one embodiment, virtualized runtime environment 140 may recognize an annotated aload instruction and perform a particular type specialization by replacing the aload instruction with another instruction more appropriate for the particular type specialization (e.g., an iload instruction when specializing for int).

Figure 3:
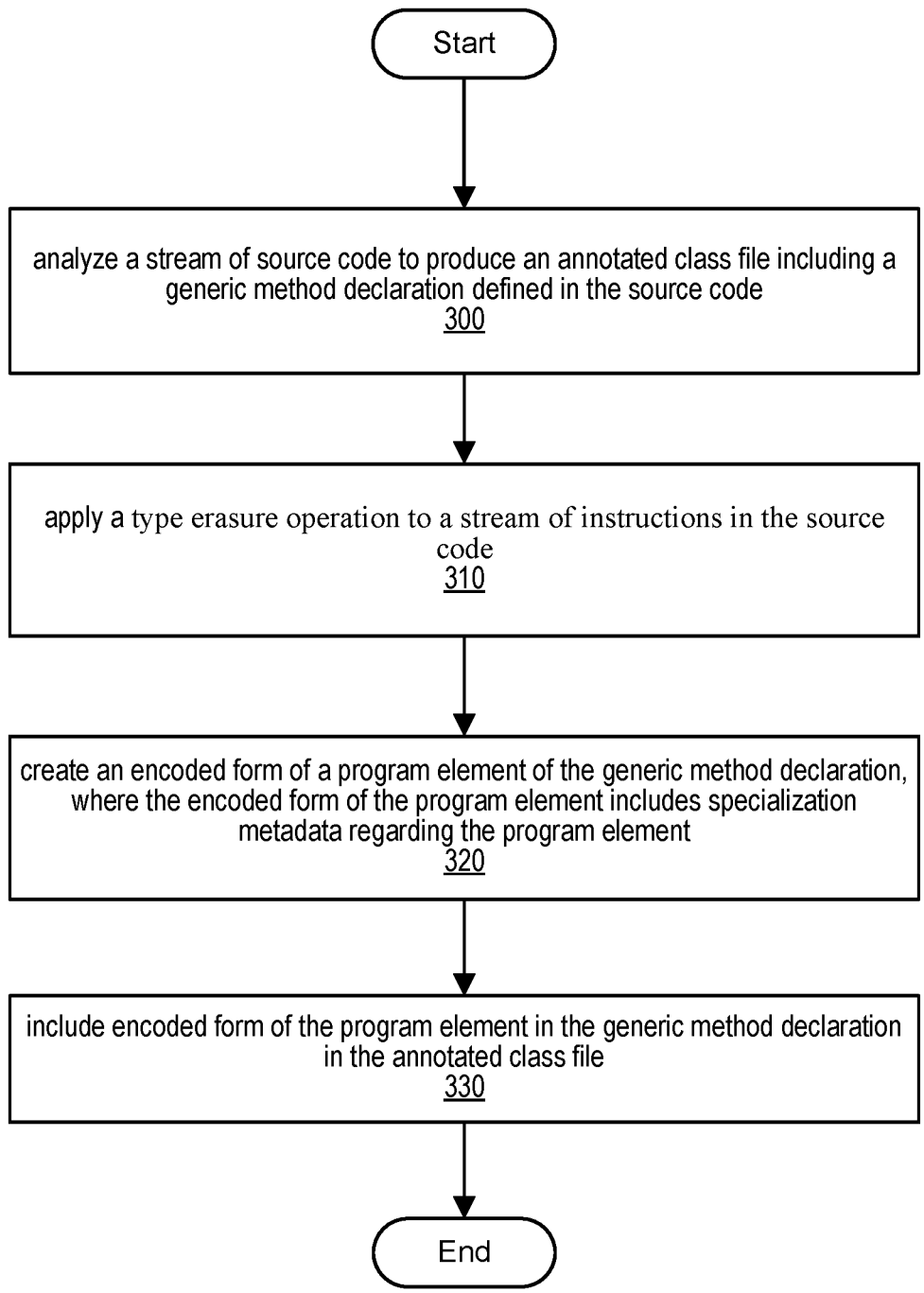
FIG. 3 is a flowchart illustrating one embodiment of a method for generating an annotated method declaration as part of generic method specialization.

FIG. 3 is a flowchart illustrating one embodiment of a method for generating an annotated method declaration as part of generic method specialization, according to one embodiment. As illustrated by block 300, a compiler, such as compiler 120, may analyze a stream of source code to produce an annotated method declaration defined in the source code, according to one embodiment. For example, compiler 120 may analyze source code 110 that includes one or more generic method declarations.

Additionally, compiler 120 may apply a type erasure operation to a stream of instructions in the source code, as illustrated by block 310. For example, in one embodiment, source code 110 may include a generic method declaration that may need to be specialized according to particular type parameterizations when being prepared for invocation and execution. Additionally, compiler 120 may create an encoded (e.g., annotated) form of a program element of the generic method declaration, where the encoded form of the program element includes specialization metadata regarding the program element, as shown in block 320.

For example, typed bytecode instructions may be made specializable (e.g., at runtime) by marking (e.g., annotating) some bytecodes as being derived from the erasure of a particular type variable T, so that on specialization, they can become specialized via a mechanical and verifiable transformation (e.g., by applying a specialization pattern or generator function). For instance, some typed bytecode instructions may be specialized based on specialization metadata marking "aload" bytecodes as "I am aload because I am derived from the erasure of type variable T", so that on specialization, they may become iload bytecodes (as one example) via a mechanical and verifiable transformation. In some embodiments, the specialization information may be, or may be considered, the result of capturing otherwise-erased, compile-time type information (e.g., as part of specialization metadata) that may be used to reconstruct types at runtime.

Figure 4:
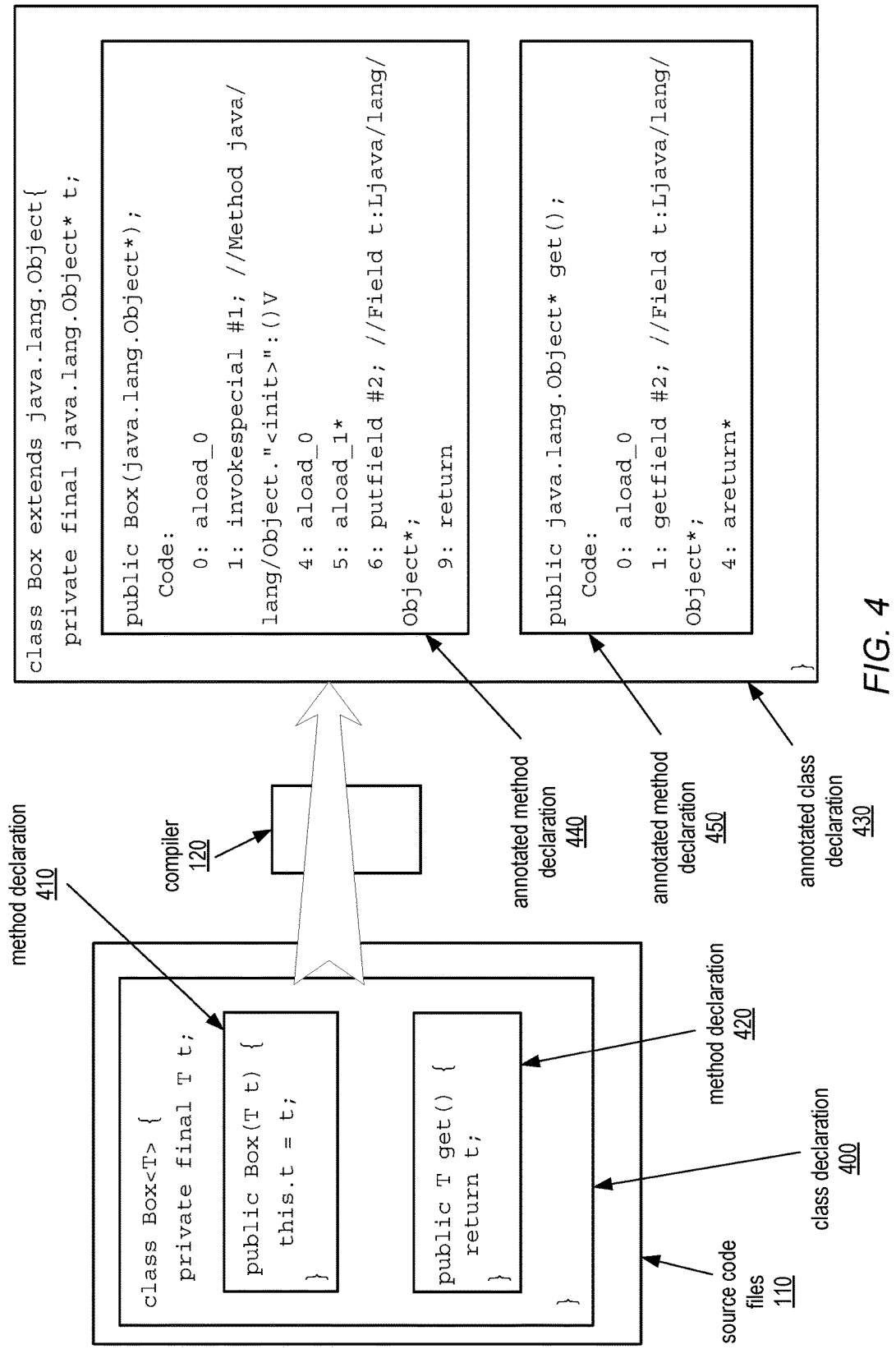
FIG. 4 is a logical block diagram illustrating method specialization as part of specializing generic classes, according to one embodiment.

FIG. 4 is a logical block diagram illustrating method specialization as part of specializing generic classes, according to one embodiment. As shown in FIG. 4, compiler 120 may generate an annotated class file according to one embodiment of the method described above regarding FIG. 3. When specializing a class, one or more methods within that class may also be specialized. Thus, compiler 120 may analyze source code 110 and may apply a type erasure on one or more program elements, such as class declaration 400, method declaration 410, method declaration 420 and/or one or more program elements of class declaration 400, method declaration 410 and/or method declaration 420. While described mainly in terms of specializing method as part of class specialization, the concepts, techniques and mechanisms may also be applied to generic method specialization as will be explained in more detail regarding FIGS. 5-16.

In some embodiments, uses of erased types in member signatures or other type uses (e.g., supertypes, casts, instanceof) may be annotated as being derived from the erasure of some type variable T, so that on specialization, they can be substituted with a proper description of a specialized type, while at the same time minimizing the runtime work of specialization by pre-computing specialization transforms and storing them as part of the specialization metadata in the annotated class file 130. Thus, some occurrences of references types in method/field signatures may be annotated as being the erasure of type variable T, so that on specialization, they can become I, according to one example embodiment.

As shown in FIG. 4, class declaration 400 may include an example Box class including method declaration 410 and method declaration 420. Method declaration 410 may include the following example method declaration:

```
public Box(T t) {
    this.t = t;
}
``` while method declaration 420 may include the following example method declaration:

```
public T get( ) {
    return t;
}
```

Compiling the example Box class with a traditional compiler (e.g., one not configured to implement generic method specialization) may yield the following bytecode for method declaration 410:

```
public Box(java.lang.Object);
    Code:
        0: aload_0
        1: invokespecial #1; //Method
            java/lang/Object."<init>":( )V
        4: aload_0
        5: aload_1
        6: putfield #2; //Field t:Ljava/lang/Object;
        9: return
``` and may yield the following bytecode for method declaration 420:

```
public java.lang.Object get( );
    Code:
        0: aload_0
        1: getfield #2; //Field t:Ljava/lang/Object;
        4: areturn
```

Numerous approaches may be taken to represent the needed generic and/or specialization information in the bytecode, according to various embodiments. For example, in one embodiment a fully generic representation at the bytecode level may be used. In another embodiment, types and bytecodes may be tagged (e.g., marked or annotated) to indicate whether that type or bytecode is directly related to a type that was present in the source file, or the erasure of some type variable.

Compiler 120 may apply a type erasure operation on method declaration 410, as described above regarding blocks 310 and 320 of FIG. 3. Thus, compiler 120 may generate specialization information regarding the method. For example, in one embodiment, compiler 120 may generate class declaration 430 including method declaration 440 and method declaration 450, either or both of which may be annotated to include specialization information (e.g., specialization metadata). In other embodiments, compiler 120 may be configured to provide or include specialization information in different, other, or additional, manners. For example, in one embodiment, compiler 120 may be configured to include specialization information regarding a generic method at method callsites (e.g., encoded within the callsite). In yet other embodiments, specialization information may be stored in a specialization store or library, from which relevant specialization information may be retrieved when needed.

For example, method declaration 440 and method declaration 450 illustrate example bytecode marked up with specialization metadata (e.g., such as to preserve erasure information), according to some embodiments. Specialization information may be specified in any of numerous manners, according to various embodiments, For example, generic method declarations may be annotated with specialization metadata including one or more characters or symbols (e.g., an asterisk in the current example) indicating various types of specialization information, such as signatures, instructions, references, types, etc., that may need to be adjusted during specialization. As shown in annotated method declarations 440 and 450, a '*' next to a type name (or other bytecode instruction) may indicate that the type is derived from the erasure of T and therefore may be adjusted during specialization. However, the use of annotated method declarations represents only one example of specialization information or specialization metadata. In other embodiments, specialization information may be specified in any of various ways and may be maintained, stored or specified in any of various locations either as part of, or separate from, the code (e.g., source code and/or executable byte code) of the application.

Thus, compiler 120 may generate the following annotated bytecode for the Box ( )method, as illustrated by annotated method declaration 440, as one example:

```
public Box(java.lang.Object*);
    Code:
        0: aload_0
        1: invokespecial #1; //Method
            java/lang/Object."<init>":( )V
        4: aload_0
        5: aload_1*
        6: putfield #2; //Field t:Ljava/lang/Object*;
        9: return
```

Similarly, compiler 120 may generate the following annotated bytecode for the Box ( )method, as illustrated by annotated method declaration 450, as one example:

```
public java.lang.Object* get( );
    Code:
        0: aload_0
        1: getfield #2; //Field t:Ljava/lang/Object*;
        4: areturn*
}
```

In the above example, in illustrated in FIG. 4, various program elements, such as bytecode instruction aload_I, may be annotated (e.g., such as with an asterisk) to indicate that they are derived from the erasure of T and therefore may be adjusted during specialization, according to some embodiments.

While the examples above include annotations utilizing an asterisk, other forms of annotation may be used in other embodiments. For example, other symbols and/or characters may be used to indicate various types of specialization information within an annotated class file, according to various embodiments. Additionally, in yet other embodiments, specialization metadata may be included in separate, specific structures within the class file. For instance, in one embodiment, an annotated class file may include one or more data structures listing or otherwise indicating which program elements may need to be adjusted during specialization.

As noted above, annotated generic method declarations may be usable directly and may also be used as templates for generated specialized versions of the methods. For instance, annotated method declaration 440 may include metadata indicating an annotated aload_I instruction. If the Box ( )method does not need to be dynamically specialized when being prepared at runtime (e.g., it is invoked with an reference or object parameter), virtualized runtime environment 140 may use the annotated aload as a traditional aload instruction and simply use an aload. However if the Box ( )method does need to be specialized (e.g., it is invoked using a non-reference parameter), virtualized runtime environment 140 may recognize and utilize the annotated instruction to perform that specialization. For instance, virtualized runtime environment 140 may perform a particular type specialization by replacing the aload_I instruction with another instruction more appropriate for the particular type specialization.

For example, virtualized runtime environment 140 may determine that an instance of the class Box needs to be specialized for T=int. According to some embodiments, when specializing for T=int, instances of objects may be replaced with ints, and a bytecodes may be replaced with corresponding i bytecodes. Similarly, some of the "aload" bytecodes may become "iload" bytecodes.

As shown in the above example, reference-specific bytecodes to be adapted from "areturn" to their int-specific counterparts, such as "ireturn" (or other primitive or value types) may also be marked. While the example above uses "aload", "astore" and "areturn" bytecodes, use of these specific bytecodes represent merely one example embodiment. Similarly, in some embodiments, components of field or method signatures that need to be adapted may also be marked. Additionally, attributes that point into the code attribute to identify which bytecodes may be adjusted for each specializable type variable, and attributes that annotate which components of field or method signatures in the constant pool similarly may be adjusted. This may, in some embodiments, take the form of new class file attributes and/or new constant pool types.

Continuing the above example, any instruction that invokes the get ( ) method may need to be adjusted when T is specialized for a non-reference type (e.g., int, long, etc.,) because the type of the return value of the specialized get ( )method may be different from the type of the return value for the erased get ( )method. Thus, in some embodiments, any instruction that refers to a type by name may need to have that operand adjusted during specialization if specialization could cause that name to change. Consequently, that instruction (and/or the operand) may be annotated as described above.

The example discussed above includes only a simplified set of program elements to be specialized and hence being annotated. In other embodiments, however, more and/or different program elements may need to be transformed during specialization and therefore may be annotated by compiler 120. In addition to "typed" bytes of which the aload instruction above is one example (other examples include areturn and aastore), other bytecodes (such as dup) may also be annotated. In general, virtually any bytecode may also be annotated by compiler 120, according to various embodiments. Additionally, while the above example utilized the Java™ programming languages the features and techniques described above apply to other programming languages as well, according to various embodiments.

In some embodiments, some bytecodes may be annotated to include multiple types of specialization information. For example, the specialization metadata associated with a particular annotated bytecode may specify both a method or class (e.g., a receiver for a method call, a hosting class for a field operation, etc.) as well as the type of data being manipulated (e.g., the type of the field, the return type of a method invocation, etc.). Additionally, specialization metadata may be utilized in more than one manner. For example, the metadata may be used to specialize signatures (e.g., class or method signatures) as well as to specialize the byte code itself (e.g., to specialize individual opcodes). For instance, bytecode generated for a particular virtualized runtime environment may be strongly typed and therefore different instructions may need to be used based on the type (e.g., the specialized type) being manipulated (e.g., a different instruction may be used to move or copy an integer than may be used to move or copy an object).

Thus, the specialization metadata used to annotate a generic method may include information about what data type is expected for a particular instruction, allowing that instruction to be changed in order to use an appropriate instruction for the particular, specialized, type being manipulated. For example, an instruction that expects to manipulate (e.g., move, copy, etc.) an object may be changed to a different version of that instruction in order to properly handle a different (specialized) type.

As noted above, an annotated generic method may be used (or interpreted) directly with no transformation but may also be used as a template for specialization at runtime. In order to allow annotated methods to be used directly, the annotated generic method may be generated (e.g., in the annotated class file) using type erasure for the most common type information.

In some embodiments, the most common interpretation(s) may be pre-instantiated—thus potentially avoiding an extra translation step at runtime (e.g., for the most common interpretation). For example, in one embodiment, makeList (int, int) and makeList (long, long) may be pre-instantiated for the static generic method:

static<any T>List<T>makeList(T t1, T t2).

However, the same pre-instantiated generic method may be annotated allowing it to be dynamically specialized at runtime for different type parameterizations (e.g., for non-reference types).

Figure 5:
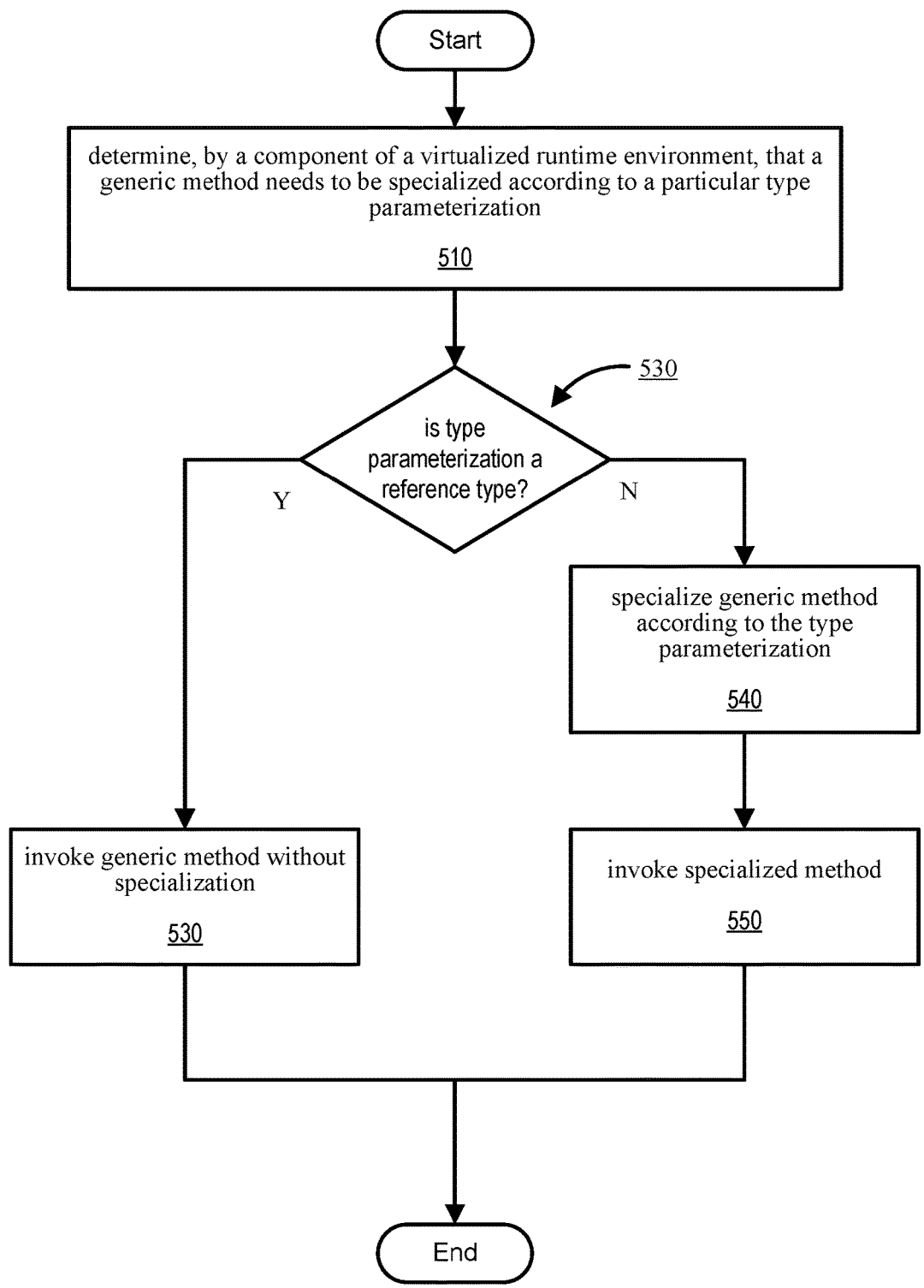
FIG. 5 is a flowchart illustrating one embodiment of a method for generic method specialization.

FIG. 5 is a flowchart illustrating one embodiment of a method for specialization using generic method specialization. As shown in FIG. 5, a virtualized runtime environment may (e.g., at runtime) determine that a generic method needs to be specialized according to a particular type parameterization, as shown in block 510. For example, during execution (e.g., at runtime) of an application within virtualized runtime environment 140, a generic method may be invoked. The callsite at which the generic method is invoked may be annotated with specialization metadata, as described above, allowing virtualized runtime environment 140 to determine that the method being invoked is a generic method that needs to be specialized according to a particular type parameterization.

If, as illustrated by the positive output of decision block 520, the particular type parameterization represents a reference type (e.g., an object), virtualized runtime environment 140 may then invoke the generic method (e.g., the erased version included in the class file by compiler 120) without specialization, such as by using an invokevirtual, invokeinterface or invokestatic instruction (e.g., whichever is appropriate for the type of method being invoked) in an Java™ based example, as shown in block 530. For instance, compiler 120 may have generated the annotated generic method using a reference type parameterization and therefore the annotated generic method may not need any additional specialization at runtime when invoked for a reference type parameterization.

If, however, the particular type parameterization is not a reference type, as illustrated by negative output of decision block 520, virtual runtime environment 140 may then specialize the generic method according to the particular type parameterization, as shown in block 540 and may then invoke the specialized method, such as by using an invokedynamic instruction in a Java™ based example, as shown in block 550.

The description of FIG. 5 above refers mainly to Java™ based examples and the use of Java™ instructions to illustrate one possible example. However, in various embodiments, generic methods may be specialized (e.g., for reference and/or non-reference types) using different programming languages and/or different language instructions.

When specializing a generic method for a particular type parameterization, virtualized runtime environment 140 may perform a particular specialization transformation on the template (e.g., the annotated, erased generic method from the annotated class file) based on the particular type parameterization to produce the specialized version of the generic method. For example, the specialization metadata for a generic method may include information specifying a particular specialization pattern or generation function that may be used to produce a particular specialization of the method for various type parameterizations. In some embodiments, a structural description of how to generate specialized versions of the generic method may be included (or encoded) within the specialization metadata. A specialized method generator function may take, as arguments, the method to be specialized and its specialization arguments. Thus, a specialized method may be the result of passing a generic method (e.g., an annotated generic method declaration) and specialization metadata to a specialized method generator function.

Figure 6:
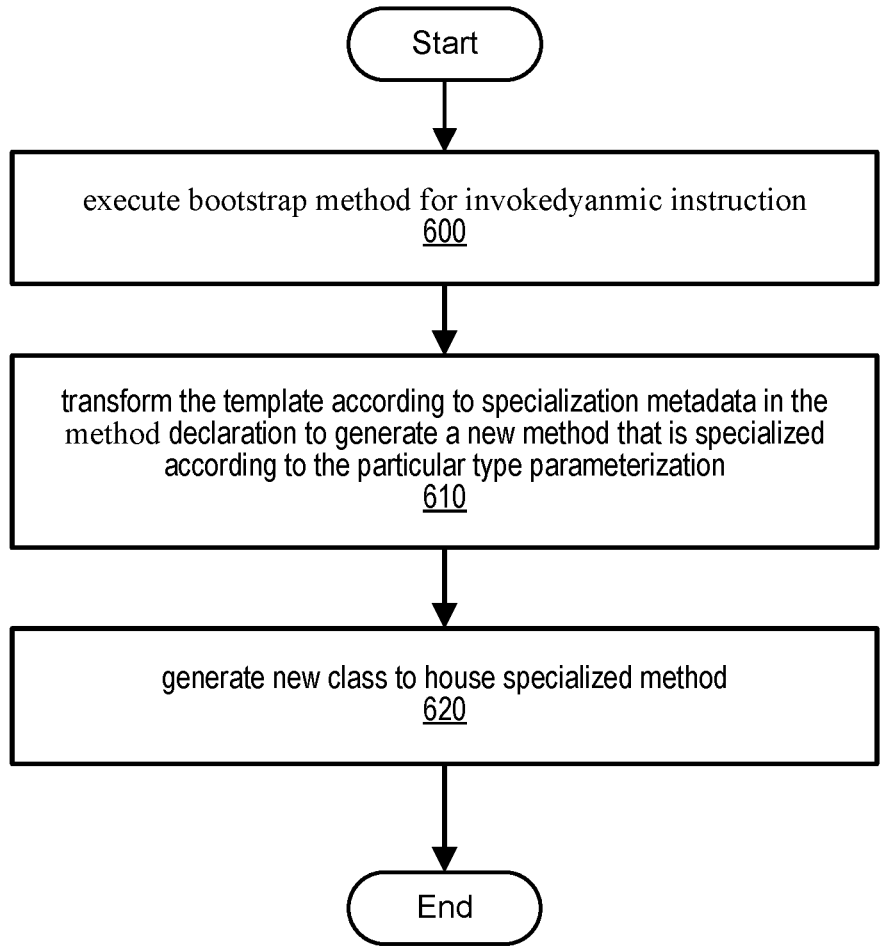
FIG. 6 is a flowchart illustrating one embodiment of a method for specializing and invoking a generic method using the invokedynamic instruction.

One mechanism by which the instantiation parameters of a specialized method invocation may be described is with the Java™ invokedynamic instruction. FIG. 6 is a flowchart illustrating one example embodiment of a method for specializing a generic method using the invokedynamic instruction using a Java™ based example.

As noted above, structural descriptions may be used to describe a particular specialization pattern or specialized method generator that may be used to produce specialized versions of a generic method. However, at the method level, there may not be a natural way to describe the generic method according to a structural description (e.g., because a method is typically described by its name and type descriptor). So there may not be a natural identifier of a specializer method. Therefore in some embodiments, an additional level of indirection may be utilized by the VM to process specialized generic methods.

Thus, in some embodiments, the invokedynamic facility of the JVM may be used to generate, as well as invoke, specialized versions of generic methods. For example, the invokedynamic facility of the JVM may provide a means to encode a combination of linkage rules (e.g., the rules to link to a specialization of the named method), the method template (e.g., the name and signature of the method to specialize) and the instantiation type arguments (e.g., the type arguments specified/inferred at the call site). When using the invokedynamic instruction to specialize a generic method the bootstrap method may be executed as part of the invokedynamic instruction, as shown in block 600.

Within the Java™ programming language the invokedynamic instruction has multiple arguments, including two argument lists. One of the argument lists to the invokedynamic instruction is a static argument list of the known properties of the callsite (e.g., the invocation location of the generic method). In some embodiments, when specializing a generic method using invokedynamic, one or more type parameters (e.g., those inferred to be part of the type parameterization of the particular specialization of the generic method) may be included as part of the static argument list to the invokedynamic instruction. The invoke-dynamic instruction also has a dynamic argument list including arguments being passed to the method being invoked (e.g., the generic method being specialized). Additionally, the invokedynamic instruction takes, as a parameter, a bootstrap method configured to generate and return a method.

Thus, the invokedynamic instruction may be viewed as providing an extra level of indirection in which logic (e.g., program logic) may be injected at linkage time (e.g., via the bootstrap method). Linkage time, as used herein, may be considered the first time that a particular generic method is invoked. By performing the specialization at linkage time via the bootstrap method, the amount of work performed for subsequent (e.g., after the first) invocations of a generic method may be minimized, according to some embodiments. By using the invokedynamic instruction, the particular method may be invoked using custom linkage involving calling linkage logic the first time the call site is encountered during runtime (e.g., the first time the method is invoked). The custom linkage logic may be provided by the programmer as opposed to using the standard linkage logic provided by the runtime environment.

Generally, the callsite may be considered logically part of any invoke instruction. However, when using invokedynamic the callsite is exposed to runtime library code so that the library code can perform additional logic on it. Thus, when using the invokedynamic instruction as described herein, the callsite may be made editable and cooperatively creatable by the library code. The callsite may be kept hidden by the virtualized runtime environment for all other invoke instructions, according to various embodiments.

Using Java™ as one possible example, a generic method may traditionally be an erased method that can be invoked using the same invoke bytecodes as used for any other method (e.g., invokevirtual, invokeinterface, or invokestatic). When specializing a generic method as described herein however, a compiler may first infer what the specialized parameters are, and if those parameters are inferred as reference types, the erased method may be invoked using the traditional linking rules/idioms. If, however, the specialized parameters are inferred at primitive or value types, the compiler may issue an invokedynamic instruction to invoke the method, according to some embodiments.

When specializing a generic method using invokedynamic, an identification of the template (e.g., the annotated, erased method in the class file), as well as the particular parameterization types may be passed to the bootstrap method so that the bootstrap method may then invoke the transformation on the generic method to generate the specialized version of the method. For example, method arguments to the bootstrap (e.g., provided at link time) may specify the class including the generic method (e.g., Foo), a method handle describing the method to be specialized (e.g., Foo.makeList), and the specializations of the type parameters (e.g., in the above example, I representing int).

Thus, the first time the generic method is invoked, the "recipe" (e.g., the pattern or specialized method generator) for generating the specialized version of the method may be embedded in the callsite. By embedding the "recipe" in the callsite, the class that holds the generic method, the identification of the generic method, the specialization metadata, and the parameters to the generic method may all be known at the time the method is invoked. The custom linkage logic (e.g., the bootstrap method) may then retrieve the bytecode (e.g., the annotated generic method declaration) for the particular generic method, perform a specialization transformation on it, convert the result to a method through the Java™ class loading mechanism, and return a handle to the specialized method to the runtime environment (e.g., via the invokedynamic instruction). When specializing the generic method, the custom linkage logic (e.g., the bootstrap method) may execute the specialized method generator, passing it the generic method and the specialization metadata, according to some embodiments.

When the same generic method is later invoked again with the same type parameterization, the virtualized runtime environment can use the same handle rather than specializing the method again, according to some embodiments.

For example, the following example code illustrates a static generic method:

```
static<any T> List<T> makeList(T t1, T t2) {
    List<T> list = new ArrayList<T>( );
    list.add(t1);
    list.add(t2);
    return list;
}
```

If the above makeList example method is invoked with T=int, as shown below:
List<int>list=Util.<int>makeList(3, 4);
a version of makeList that is specialized to T=int may be invoked. In some embodiments, the explicit type int is elided and the compiler may infer it, as shown below:
List<int>list=Util.makeList(3, 4);
At runtime, the virtualized runtime environment may up-call to the language runtime (e.g., using a bootstrap method to invokedynamic) to link the call site for a specific set of type parameters (e.g., T=int). For example, the following bytecode may be generated for the above example:

```
0: iconst_3
1: iconst_4
2: invokedynamic #3,0 // InvokeDynamic
#0:makeList:(II)Ljava/anyutil/List${0=I};
```

In the above example, the invokedynamic instruction may be described according to the following bootstrap method:

```
0: #29 invokestatic
java/lang/invoke/GenericMethodSpecializer.metafactory:(Lja
va/lang/invoke/MethodHandles$Lookup;Ljava/lang/String;Ljav
a/lang/invoke/MethodType;[Ljava/lang/Object;)Ljava/lang/in
voke/CallSite;
    Method arguments:
        #30 LFoo;
        #31 invokestatic
Foo.makeList:(Ljava/lang/Object;Ljava/lang/Object;)Ljava/a
nyutil/List;
        #32 I
```

Thus, as shown above, the invokedynamic bootstrap (e.g., language-specific linkage logic) may represent the java-.lang.invoke.GenericMethodSpecializer code in the language runtime that links generic method call sites, according to one embodiment.

The bootstrap method may then specialize the method by transforming the annotated method declaration (e.g., the template for the generic class) according to specialization metadata in the method declaration to generate a new method that is specialized according to the particular type parameterization, as shown in block 610. The bootstrap method associated with the invokedynamic callsite may be designed for calling specialized generic methods. In some embodiments, the bootstrap method may look in the static argument list (e.g., provided via the invokedynamic instruction) to find the name and signature of the generic method being invoked and to find the specialized parameters (to the generic method).

According to some embodiments, for each callsite in a program invoking a specialized version of a generic method, at linkage time, the virtualized runtime environment may utilize the invokedynamic bootstrap method to link the callsite. In some embodiments, such as those using the Java™ language, method linkage may be dynamic so the bootstrap may be utilized during runtime. In some embodiments, the runtime could perform it earlier (e.g., at class load time) while in other embodiments, method linkage may be deferred until the first time the callsite is actually encountered (e.g., the first time the method is invoked).

After the generic method has been specialized, as described above, and the initial linkage has been performed, the invokedynamic instruction may create a linkage target. In some embodiments, some other callsite may have already specialized the particular specialization of the method, in which case the linkage target might be fetched from a cache rather than being specialized again. A virtualized runtime environment may utilize an abstraction for a callsite and the virtualized runtime environment may create a callsite object everyplace in the executing code where there is an invokedynamic instruction, according to some embodiments. These callsite may be initially unlinked so the first time one is invoked, linkage logic is executed, which creates and initialized the callsite (e.g., to utilize the specialized version of the generic method). The virtualized runtime environment may then use the callsite to determine the effective address to use when branching on subsequent invocations of the generic method (e.g., when invoked using the same type parameterization and therefore the same specialized version of the method), according to some embodiments. Using the invokedynamic callsite initialization described above may allow other runtime optimizations (e.g., code motion, inlining, etc.) of the virtualized runtime environment to be compatible with the callsite initialization and usage, according to some embodiments.

The bootstrap method may also generate a new container class to house the specialized method, as shown in block 620. According to some embodiments, the bootstrap method used as part of the invokedynamic instruction may create a new container class to house the newly specialized version of the generic method. Thus, each specialization of a generic method may be contained within a separate, distinct class. Additionally, the bootstrap method may alternatively reuse a previously specialized container class rather than creating a new container class. In some embodiments, the newly specialized version of the generic method may be the only access point of the container class created by the bootstrap method. A handle to the specialized method may then be obtained, such as by using Java™ reflection functions, and the specialized method may then be invoked (or accessed) using the obtained handle.

Figure 7:
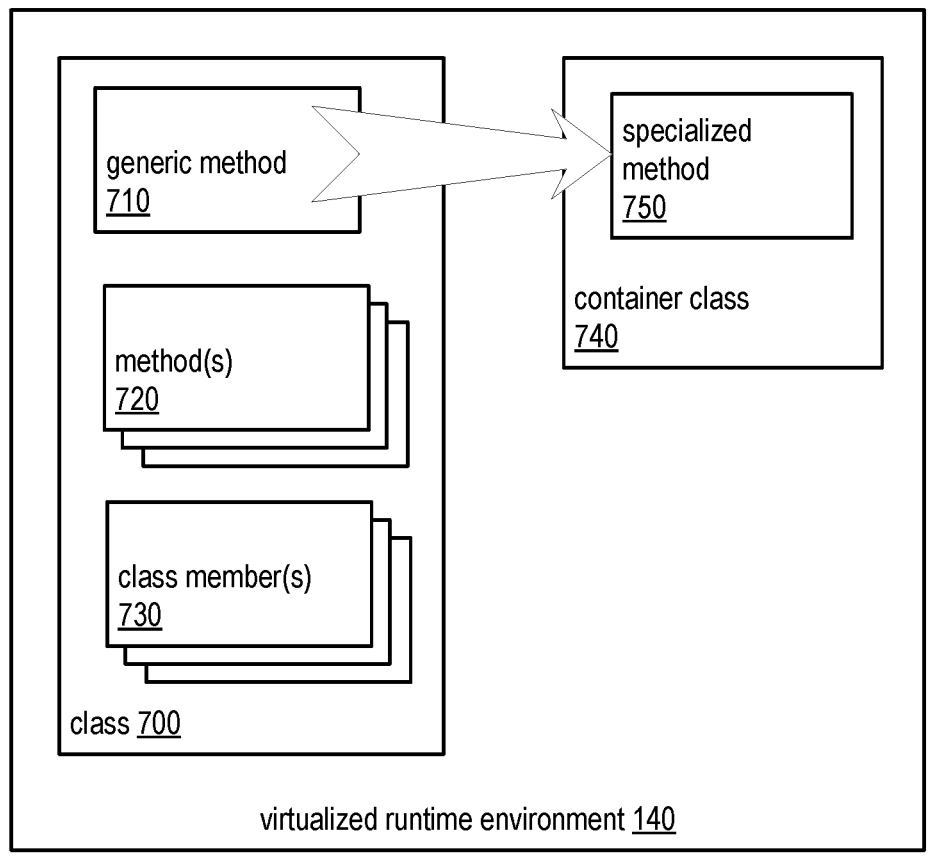
FIG. 7 is a logical block diagram illustrating one example of a generating a specialized generic method within a container class, according to one embodiment.

FIG. 7 is a logical block diagram illustrating one example of a specialized generic method that is housed within a container class, according to one embodiment. As shown in FIG. 7, during runtime, virtualized runtime environment 140 may load class 700 that includes a generic method 710, one or more other methods 720 as well as one or more other class members 730. As described above, the first time generic method 710 is invoked using a type parameterization that requires specialization (e.g., the first time the method is invoked for a non-reference type), virtual runtime environment 140 may utilize an invokedynamic instruction, as described above, to specialize generic method 710 for the particular type parameterization resulting in specialized method 750.

As noted above, in some embodiments, the bootstrap method used with the invokedynamic instruction may generate specialized method 750 and create a separate container class 740 to house the specialized method. Even though specialized method 750 is housed within a separate container class 740, in some embodiments, virtualized runtime environment 140 may be configured to treat specialized method 750 as if it were a part of class 700.

Additionally, the new specialized version of the method may be treated as if it were part of the original class to which the generic method belongs (and in which it was declared) even though the specialized version is housed within a separate (newly created container class), allowing the new specialized version of the generic method to be invoked as if it were part of the original class, according to some embodiments. Thus, generic method specialization may involve having two different classes, one that was generated statically by the compiler (e.g., the original class in which the generic method was defined) and one that is generated dynamically at runtime (e.g., the container class holding the specialized version of the method) and treating them as if they were one class (e.g., by allowing the specialized method to be invoked as if it were part of the original class). In other words, the virtualized runtime environment uses the specialized method that is in the container class as if the bytecode were in the original class that was loaded previously, according to some embodiments. Thus the various name linkage and access control decisions being made when loading the body of the newly created container class are handled as if they were coming from the original class in which the generic method is defined.

Allowing the specialized version of the generic method to be invoked as if it were part of the original class, rather than as part of the new class that is housing it, may allow inheritance and supercalls to function properly, according to some embodiments. For example, when utilizing inheritance and method overriding, it is possible to make a call back to a superclass version of an overridden method. If the overridden method is generic and since the specialized version of the method may be housed in its own separate container class, a naïve implementation would not be able to make a supercall because the specialized method is not actually a member of the subclass. However, by treating the specialized method as part of the original class, supercalls may be performed. For example, in a Java™ based embodiment, one or more Java™ reflection methods may be utilized to determine the location (e.g., the callsite) that would be called if the superclass method were called from the original context of the overriding method. As another example, if a specialized method is executed as if it were part of the original class, rather than as part of the new class that is housing it, may allow the method to access class members (e.g., method, variables, etc.,) that are private to that original class, even in cases where those private members would not be available to methods of other classes, according to one embodiment.

The use of invokedynamic for specializing, linking and invoking generic methods, as described above, represents only one particular example according to some embodiments. In other embodiments, other techniques for storing and accessing specialized methods may be used. For example, a method dictionary may be used such that every time a method is specialized, an entry for the specialized method is added to a shared dictionary within the virtualized shared environment. Thus, every time a generic method is invoked with a particular set of parameters, the specialized method may be looked up in the shared dictionary and the same method body may be retrieved each time.

However, the use of invokedynamic may be more efficient due to the overhead of searching the shared dictionary for every invocation of a generic method, according to some embodiments. Additionally, the use of a shared dictionary may limit the runtime environments ability to fully optimize generic method invocations. The use of invokedynamic may also provide a better level of granularity so that the runtime environment can predict under which cases a particular specialization may be reused without performing a lookup.

Furthermore, the use of invokedynamic may prevent the need to perturb a vtable layout when specializing generic methods. For example, that a class B extends a class A, and that class B overrides multiple methods from class A. When a possibly overridden method of class A is called, it must be determined which instance of the class (e.g., the superclass or the subclass) is to be used. In order to allow supercalls to function properly, the first time that a generic method is specialized that is dependent on its caller context (e.g., a supercall may be considered a form of caller context dependency) one or more Java™ reflection methods may be utilized to determine the location (e.g., the callsite) that would be called if the superclass method were called from the original context of the overriding method. That location is then used to construct a method to that location and a handle to that method is used within the specialized version of the generic method to call the superclass (e.g., the overridden) method. That superclass location may then be invoked directly.

Figure 8:
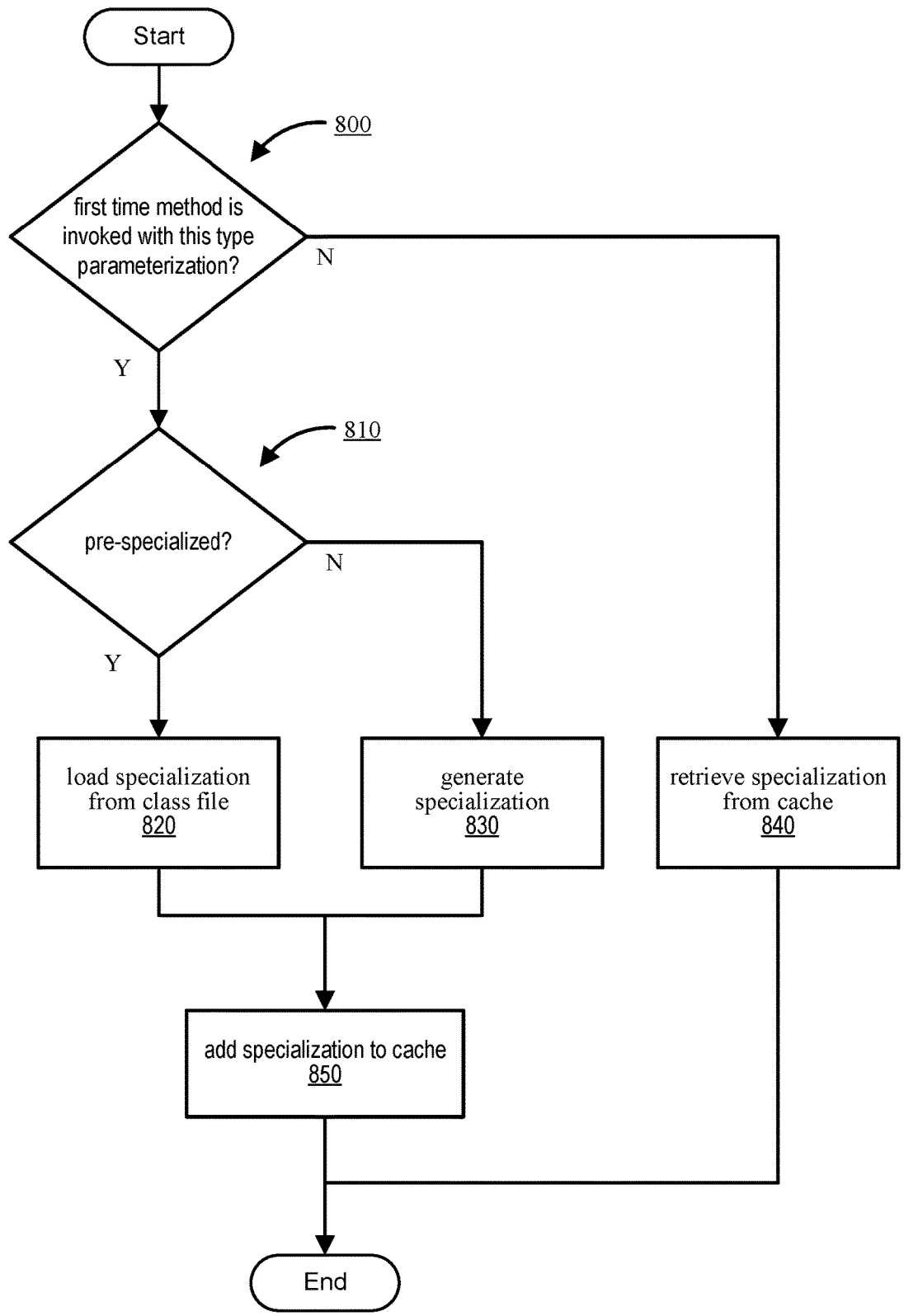
FIG. 8 is a flowchart illustrating one embodiment of a method for loading a specialized generic method.

A generic method may not have to be specialized every time the method is invoked. FIG. 8 is a flowchart illustrating one embodiment of a method for loading a specialized generic method. When a generic method is first invoked with a particular type parameterization, as indicated by the positive output of decision block 800, the runtime environment may first determine whether the generic method was pre-specialized for this particular type parameterization, as indicated by decision block 810. For example, the generic method may have been specialized earlier, such as by a specializer tool at build time.

If the generic method was pre-specialized for the particular type parameterization, as indicated by the positive output of decision block 810, the specialization may be loaded from the class file in which it stored, as indicated by block 820. For example, in one embodiment a bootstrap method utilized by the Java™ invokedynamic instruction may be configured to determine whether the generic method was pre-specialized for this particular type parameterization and if so, locate and load the specialization.

If, however, this is the first time the generic method is invoked for this particular type parameterization and the method was not pre-specialized, as indicated by the negative output of decision block 810, specialization may be dynamically generated as shown in block 830. For example, the bootstrap method of the invokedynamic instruction may be configured to specialize the generic method for the particular type parameterization, as described above regarding FIGS. 5, 6, and 7.

If, however, this is not the first time the generic method was invoked with this particular type parameterization, the specialization may be retrieved from a specialization cache, as shown in block 840. For example, in one embodiment, the bootstrap may retrieve the result from the cache and link the callsite to invoke the method from the cache (thus potentially increasing performance over specializing the method again). If the specialization is not already in the cache, such as when the generic method is first invoked for the particular type parameterization, the specialization may be added to the specialization cache, as shown in block 850.

While FIG. 8 illustrates a particular, logical arrangement of techniques, in some embodiments, the features and functions illustrated in FIG. 8 may be performed in a different and/or arrangement. For example, the specialization cache may be used to determine whether or not the generic method had been previously invoked for the particular type parameterization. Thus, in one embodiment, a bootstrap method may search the specialization cache to see if the particular generic method being invoked has already been specialized using the particular combination of type parameters.

In other embodiments, a compiler generated, lazily initialized cache could be utilized for storing references to specialized generic methods. The references may initially be empty (e.g., null) and the compiler may emit code to lazily initialize the references (e.g., when a generic method is first invoked for a particular parameterization) and then use that reference when branching. However, the runtime environment may not be able to utilize such optimizations with a compiler-generated, lazily initialized cache, in some embodiments. Additionally, the compiler may have to ensure that the callsite is properly initialized every time the generic method is invoked (e.g., to determine whether this is the first invocation of the generic method with a particular type parameterization), thus potentially reducing (in comparison to using the invokedynamic callsite initialization mechanism described above) overall performance efficiency in some embodiments.

Instance Methods:

Generic instance methods may also be specialized as described herein. For example, the following example code illustrates a generic method that is an instance method:

```
interface List<any T> {
    <any U> List<U> transform(Function<T,U> mapper);
}
```

In the above example, a mapping function may be applied to each element of the interface List<T>. For instance, in one example T may be "Person" and the mapping function may extract the person's height:

```
List<Person> people = ...;
List<int> heights = people.transform(p -> p.getHeight( ));
```

Thus, one possible implementation of List.transform may be:

```
class ArrayList<any T> implements List<T> {
    <any U> List<U> transform(Function<T,U> mapper) {
        List<U> result = new ArrayList<U>( );
        this.forEach(e -> result.add(mapper.apply(e)));
        return result;
    }
}
```

As shown in the above example, the input to specialize may not only be the type variable for the method (e.g., U), but may also be the type variable from the class—which may vary with the receiver of the interface. Additionally, since there may be multiple possible implementations of List.transform. For example, an invocation such as (the int type may be inferred by the compiler):

someList.<int>transform(someTransformFunction);

Thus, when the bootstrap method of an invokedynamic instruction attempts to link the call site, it may not yet know which implementation of List.transform to specialize. The bootstrap may be able to determine some information about the type of the receiver. For instance, in the example above, the receiver (e.g., someList) must be a List, but it could be an ArrayList, a LinkedList, etc., and the receiver may vary across invocations of the same callsite. Thus, in some embodiments, instead of specializing the target (or using a cached specialization) and blindly linking to that, another layer of indirection may be used. For instance, the bootstrap method may link to a dynamic-dispatch method that may examine the dynamic type of the receiver. After examining the dynamic type of the receiver, the particular specialized version of the method (e.g., based on the type information for the method and the receiver) may be generated (e.g., or a previous version located) and dispatched.

According to various embodiments, generic method specialization may be considered a component of the compiling/execution tool chain. In other words, systems that implement generic method specialization may have latitude to perform specialization either on demand at runtime (e.g., if the virtualized runtime environment is willing/able to do so), or ahead of time (e.g., prior to runtime). Thus, in some embodiments, generic method specialization may be implemented so as to specialize at runtime only those methods (or classes, references, etc.) being used. In other embodiments however, the specialization of generic methods may be implemented so as to generate multiple possible specializations at build time (e.g., prior to runtime), according to some embodiments.

Specializing generic methods may involve the ability to specialize as few or as many methods (or other program elements) as desired at build-time (e.g., prior to runtime) and to dynamically specialize any additional methods (or other program elements) as required at runtime, according to various embodiments. In other words, generic method specialization may provide flexibility to determine and take advantage of various tradeoffs, such as between application start up time (e.g., specialization/instantiation prior to runtime) and footprint size (e.g., specialization/instantiation at runtime).

The flexibility to delay specialization as late as runtime (e.g., when a method is first invoked) or as early as build time (e.g., based on various engineering concerns)—while still using the same format and the same process (e.g., the same specialization metadata and specialization transformations)—may be considered a feature of generic method specialization, according to some embodiments. Furthermore, in some embodiments, specialization may be considered to be delayed even later than the first invocation of a method since each invocation may trigger a new specialization (e.g., if the receiver type varies from call to call).

Whether to specialize a generic method (or other program element) at build time or runtime may be determined based on various criteria, according to various embodiments. For example in one embodiment, a compiler 120 (or other software development tool) may be configured to determine which generic methods (e.g., which specializations of those generic methods) may be most likely to be used based on the source code and may specialize those generic methods at build time while allowing other generic methods (e.g., other specializations of those generic methods) to be specialized at runtime (e.g., when those generic methods are first invoked). In another embodiment, the number of generic methods to be specialized at build time may be based, as least partially, on particular target values related to application footprint size and/or application startup speed. In yet other embodiments, a compiler may utilize a combination of expected method use, footprint size and/or startup speed when determining whether methods should be specialized at build time or runtime.

In general, the particular criteria used to determine whether to specialize any particular method at build time or dynamically at runtime may also be based, at least in part, on user (e.g., programmer) input—either directly in the source code, or alternatively via one or more user interface modules (e.g., of application building software), according to one embodiment.

Thus, systems implementing generic method specialization may perform specialization early (e.g., before runtime) to generate specializations of generic methods that are known to be needed and therefore allow the application to start up faster (e.g., not generating every possible specialization), while also dynamically specializing generic methods at runtime that were not specialized earlier.

Additionally, the specialization of generic methods may also be utilized by other components and/or services (either stand alone or part of a virtualized runtime environment), according to some embodiments. For example, debugging, profiling, local variable type tables, garbage collection, etc., may also take advantage of generic method specialization as described herein. In general, virtually any aspect of software development, execution and/or debugging that involves manipulating data types may take advantage of, and/or implement, generic method specialization. Thus, in some embodiments, specialization metadata may be propagated to one or more components, such as to allow those components to determine specifics about the types of data that are being specialized and regarding the specialized versions of generic methods being used. In other words, the annotated type information (e.g., the specialization metadata) may inform multiple components/services (e.g., application execution, debugging, garbage collection, profiling, etc.).

Dependency-Driven Co-Specialization

According to some embodiments, the loading, invocation, execution or operation of a specialized generic class or method may trigger the specialization of other methods or classes. For example, the following example code illustrates dependency-driven co-specialization of a class in response to specializing a method:

```
class Map<K,V> {
    static<K,V> newEmptyMap( ) {
        return new Map<K,V>(0);
    }
}
```

In the above example, specializing the method newEmptyMap may trigger the specialization of the class Map, according to some embodiments. Similarly, the specialization of one method may trigger the specialization of another generic method that it calls or otherwise references.

According to some embodiments, a compiler, such as compiler 120, may recognize dependency relationships between generic types and may describe the dependent types in terms of the type variables of the triggering types (e.g., the types that trigger the specialization of the dependent types). For example, a compiler configured to implement generic method specialization may include structural references indicating dependency relationships in a class file, according to one embodiment. In other embodiments, a compiler may be configured to provide include dependency information in other places, such encoded within a method site, within a particular storage location configured to store dependency information, etc.

For example, if the generic method <T> makeList (T t), internally uses a generic class listNode, rather than just using the name listNode, the compiler may utilize a structural description referring to the, e.g., "the class resulting from applying a specialization transform to List with the type parameter T." In other words, the compiler 120 may be configured to write out (e.g., to a class file, at the method callsite, or to another storage location) specialization information that includes a description of a generic supertype in terms of a type variable of the generic subtype. Additionally, when a method is specialized, the structural descriptions it contains may be specialized as well. Thus, specialization information, such as a structural description, may be specialized in response to specializing a method (or other type) that includes that specialization information.

As noted above, specialization information, and/or structural descriptions, may include information regarding types that may need to be adjusted during specialization. For instance, in the example below:

```
class Map<K,V> {
    static<K,V> newEmptyMap( ) {
        return new Map<K,V> 0;
    }
}
```

The type variables K and v may appear in the structural description of map< >, so that when Map<K, v> is specialized for K=int, the occurrence of K in the structural description is replaced with int, according to one embodiment.

According to some embodiments, the type parameter T, when declared between the "< >", introduces a type variable T, similar to the manner in which a formal parameter declared between the "( )" of a method introduces a variable. The type variable T may be used in the signature of the generic method (e.g., as a return type or method parameter) as well as in the body of the generic method (e.g., as in the type of a field). Within the body of a generic method, the type variable T may appear in a type argument position (e.g., as a field declaration, such as "List<T> f;") as well as in a top level position (e.g., as a field declaration, such as "T f;"). Co-specialization may be triggered whenever the type variable T is used in a type argument position, according to some embodiments. For example, when a generic method is specialized for a particular return type, one or more type within the method body may also be specialized, At runtime the specialization of one method may trigger the specialization of other types. For example, if an implementation of <T> makeList (T t1, T t2), refers to Bar<T>, the specialization of makeList may trigger the specialization of Bar (e.g., because Bar may be required to complete the specialization of the code for makeList), according to some embodiments. The runtime environment, such as virtualized runtime environment 140 may recognize the dependency relation using any of various types of information, such as by using the information about the dependent types included in a class file, or in other specialization information by the compiler.

Figure 9:
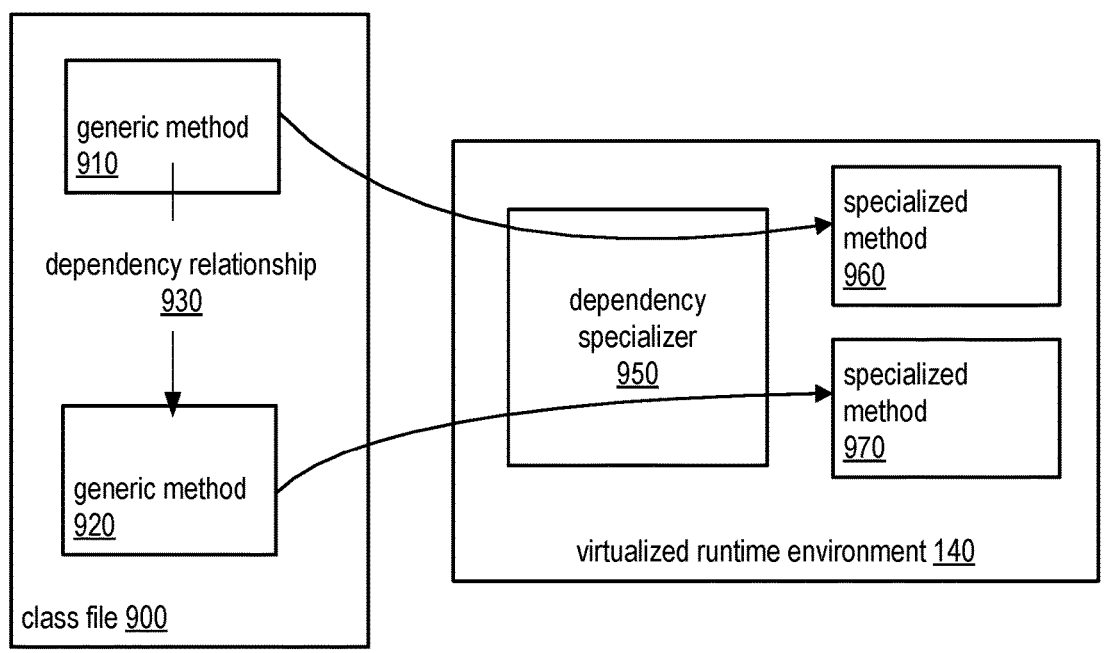
FIG. 9 is a logical block diagram illustrating dependency-driven, co-specialization, according to one embodiment.

Turning now to FIG. 9, which is a logical block diagram illustrating one example embodiment of dependency-driven co-specialization of specialized methods, as described herein. As shown in FIG. 9, class file 900 may include generic method A 910 and generic method 920, which have a dependency relationship 930. For example, in one embodiment, generic method 910 may be dependent upon generic method 920. When dependency specializer 950 specializes generic method 910 to generate specialized method 960, such as upon invocation of generic method 910 for a particular type parameterization, dependency specializer 950 may determine (e.g., recognize) the dependency relationship between generic method 910 and generic method 920 and may therefore also specialize generic method 920 to generate specialized method 970, according to some embodiments. Thus, the dependency relationship 930 between generic method 910 and generic method 920 may trigger the specialization of generic method 920 whenever generic method 910 is specialized.

Figure 10:
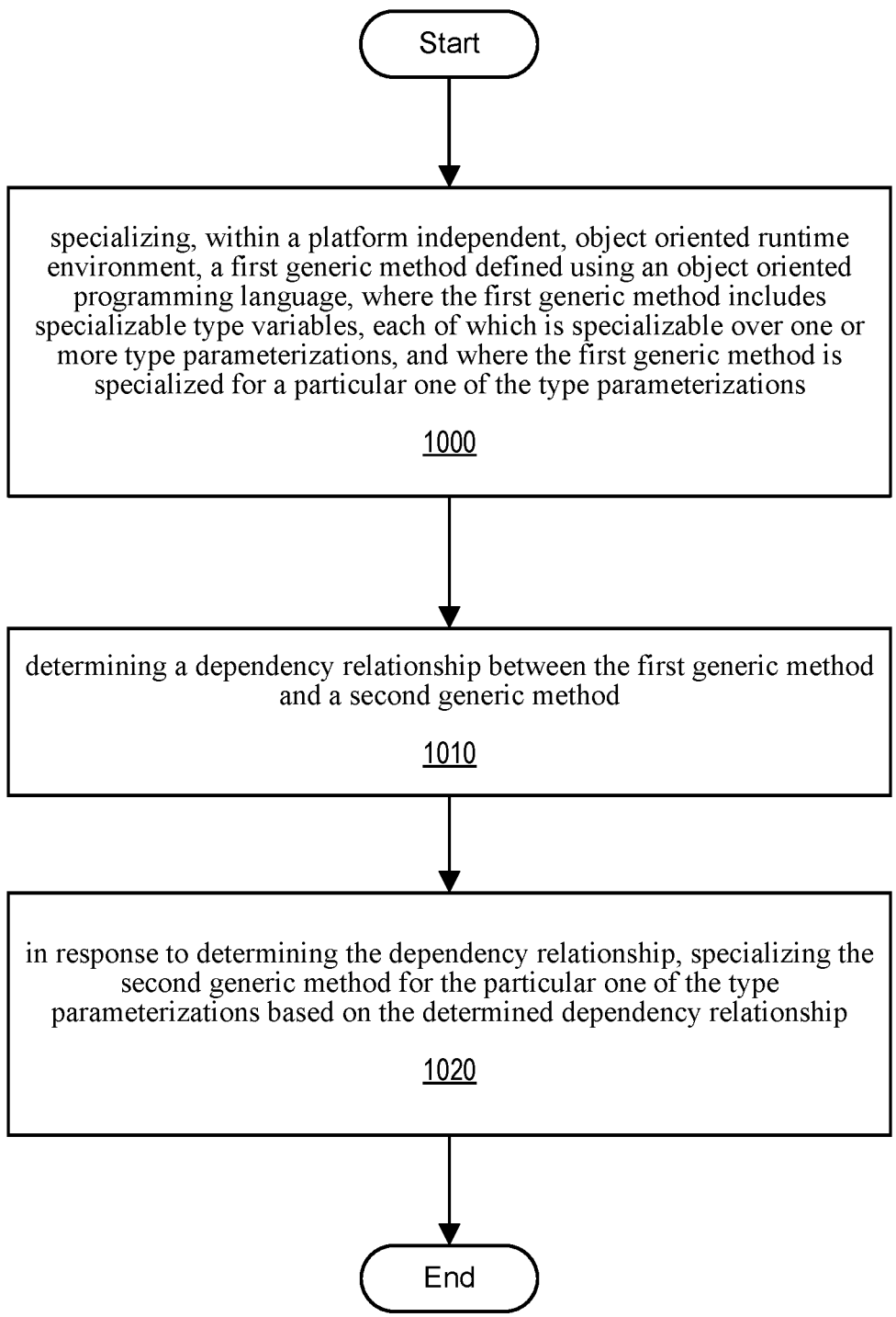
FIG. 10 is a flowchart illustrating one embodiment of a method for dependency-driven, co-specialization, as describe herein.

FIG. 10 is a flowchart illustrating one embodiment of a method for dependency-driven co-specialization of specialized methods, as described herein. As shown in block 1000, a method for implementing dependency-driven co-specialization may include specializing, within a platform independent object oriented runtime environment (e.g., virtualized runtime environment 140), a first generic method defined using an object oriented programming language. The first generic method may comprise one or more specializable type variables and each of the one or more type variables may be specializable over one or more type parameterizations. Furthermore, the first generic method may be specialized for a particular one of the type parameterizations.

For instance, as described above, generic method 910 defined in class file 900 may be instantiated for a particular type parameterization. Thus, the generic method may be specialized within virtual runtime environment 140 (e.g., within a platform independent object oriented runtime environment) for that particular type parameterization.

According to one example embodiment, a Java™ based generic method static<any T> List<T> makeList (T t1, T t2) may be specialized for type int. Thus, the generic class List may be specialized within a Java™ based virtual machine for T=int, according to the example embodiment.

As shown in block 1010, a dependency relationship may be determined between the first generic method and a second generic method, according to some embodiments. For example, a specializer of the runtime environment, such as specializer 170 and/or dependency specializer 950 of virtualized runtime environment 140, may be configured to determine dependency relationships between two methods, such as dependency relationship 930 between generic method 910 and generic method 920 illustrated in FIG. 9, described above. Additionally, in some embodiments, dependency relationships may exist between a generic method and a generic class or some other generic type.

The dependency between two method (or between a method and a class) may involve (e.g., be created or triggered) by virtually any type-use of a generic type B with a generic type A, according to various embodiments. For instance, a dependency relationship may involve (or be defined/created by) the use of a supertype, a field descriptor, a method descriptor, or the use of another generic type, method or class within the body of a method. As one example, method <T> makeList (T t1, T t2) may return List<T>, thereby creating (e.g., defining) a dependency relationship between method makeList and class List <T>.

Dependency-driven co-specialization may be triggered whenever a generic type parameter (e.g., characterized by <T> in the above examples) appears. Thus, dependency-driven co-specialization may be triggered (e.g., specialization may occur) whenever a generic type parameter appears as a supertype, as a target of a cast, as the type of a method parameter or return type, or virtually anywhere that a type parameter can appear, according to some embodiments. For example, dependency-driven co-specialization may be triggered when a generic method takes a specializable parameters type T and T is used, either directly or indirectly, in a type argument position, such as in the body of the generic method (e.g., as a type-argument to another generic method or a generic class), according to some embodiments. Thus, some usages of the type T may be visible in the source code, while others may not. For instance, in the following example,

```
<T> someGenericMethod( ){
    Box<T> bt = new Box<T>( );    //T used directly
    bt.get( );                    // T used indirectly
}
```

T is used both directly and indirectly in the same method body. Thus, the particular usage of a type that triggers dependency-driven co-specialization may be embedded within a set of type information that the compiler knows about at a given point in time, according to some embodiments.

As shown in block 1020, in response to determining the dependency relationship, the second generic method may be specialized for the particular type parameterization based on the determined dependency relationship, according to one embodiment. Continuing the example above, the specialization of <T> makeList (T t1, T t2) for a particular type parameterization may trigger the specialization of List<T> for the same parameterization. Thus, if class <T> makeList (T t1, T t2) were specialized for T=int, the class List<T> may also be specialized for T=int, according to some embodiments.

Additionally, the same dependency relationship between methods (or other types) may also be used to trigger specialization for different parameterizations. For example, specializing <T> makeList (T t1, T t2) for int may trigger the specializing of List<T> for int. Subsequently <T> makeList (T t1, T t2) may be specialized for long, which may trigger the specialization of List<T> for long. Once a dependency relationship between two generic method (or between a generic method and a generic class) is defined, that dependency relationship may trigger the specialization of the dependent method whenever (and however many times) the first method is specialized, according to some embodiments.

While described above as two separate and distinct specializations performed in a particular order, the specialization of the first and second generic method may occur in any order and/or may overlap, according to various embodiments. For example, in one embodiment, specializer 950 may, determine the dependency relationship between the first generic method and the second generic method and, in response, may specialize the second generic method prior to specializing the first generic method. In another embodiment, specializer 950 may begin specializing the first generic method, determine the dependency relationship, specialize the second generic method and then complete the specialization of the first generic method.

For instance, a first generic method may take the result of a second generic method as a parameter. Thus, when the first generic method is invoked for a particular type parameterization, the second generic method may have to be specialized (e.g., by the bootstrap method of an invokedynamic instruction) in order to then specialize the first generic method appropriately.

Figure 11:
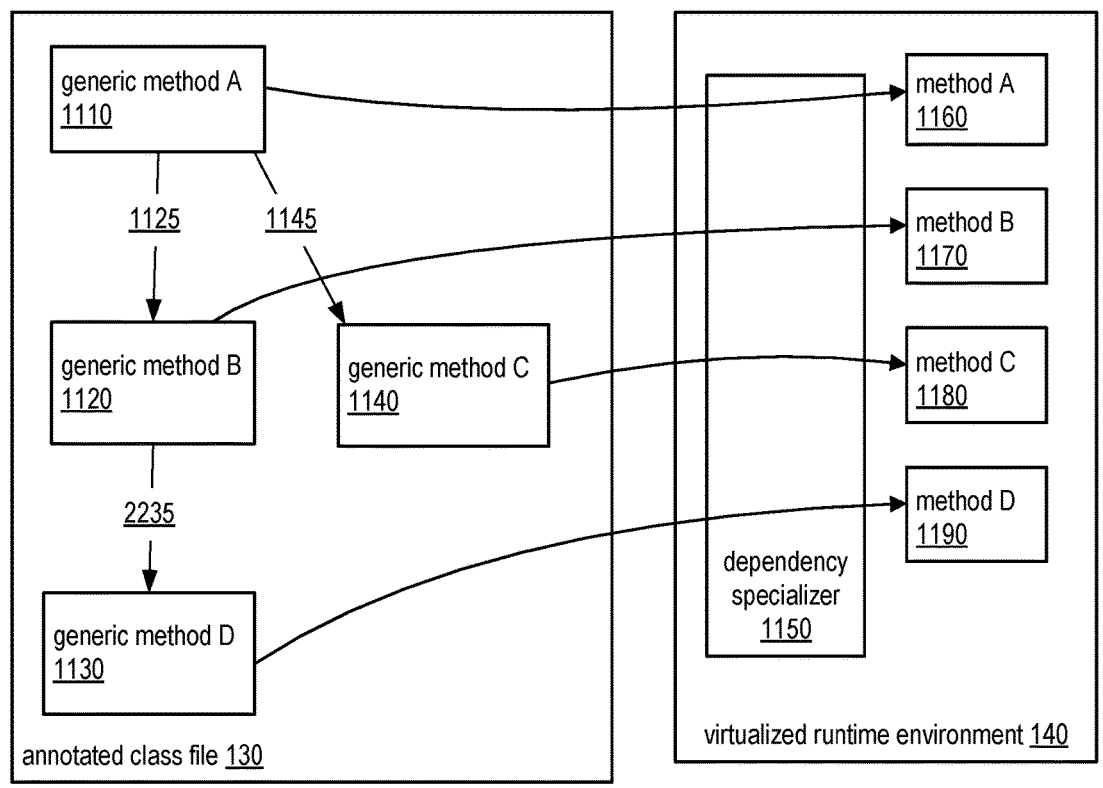
FIG. 11 is a logical block diagram illustrating dependency-driven, co-specialization involving multiple dependencies within a dependency chain, according to one embodiment.

While the examples above regarding FIGS. 9 and 10 illustrate a single dependency relationship between two methods, dependency-driven co-specialization may involve multiple (even many) layers of dependency (or dependency chains). In some embodiments, there may be many levels of dependencies in both depth and breadth. For example FIG. 11 is a logical block diagram illustrating a dependency-driven co-specialization involving multiple dependencies within a dependency chain according to one embodiment. As illustrated in FIG. 11, a class file may include multiple generic methods, such as generic method A 1110, generic method B 1120, generic method C 1140 and generic method D 1130. Additionally, the class file may define dependency relationships between the generic methods. For example, generic method A 1110 may depend on generic method B 1120 and generic method C 1140, as illustrated by dependency relationships 1125 and 1135. Additionally, generic method B 1120 may itself depend upon generic method D 1130 as indicated by dependency relationship 1135.

Thus, when a specializer of a runtime environment that is configured to implement dependency-driven co-specialization, such as dependency specializer 1150 of virtualized runtime environment 140, specializes generic method A 1110 to generate method A 1160, it may determine (or recognize) the dependency relationships between generic method A 1110 and generic method B 1120 and generic method C 1140. In response to determining the dependency relationships (e.g., when specializing generic method A 1110), dependency specializer 1150 may specialize generic method B 1120 and generic method C 1140 to generate method B 1170 and method C 1180, respectively.

Additionally, when specializing generic method B 1120, whether independently (e.g., due to an independent instantiation of method B) or in response to the specialization of generic method A 1110, dependency specializer 1150 may specialize generic method D 1130 to generate method D 1190. Thus, when a first generic method is specialized, the specializer may "trace" through any dependency chains based on dependency relationships between the first generic method and any other generic methods and specialize the other methods accordingly, in some embodiments.

Partial Specialization of Specialized Methods

Figure 12:
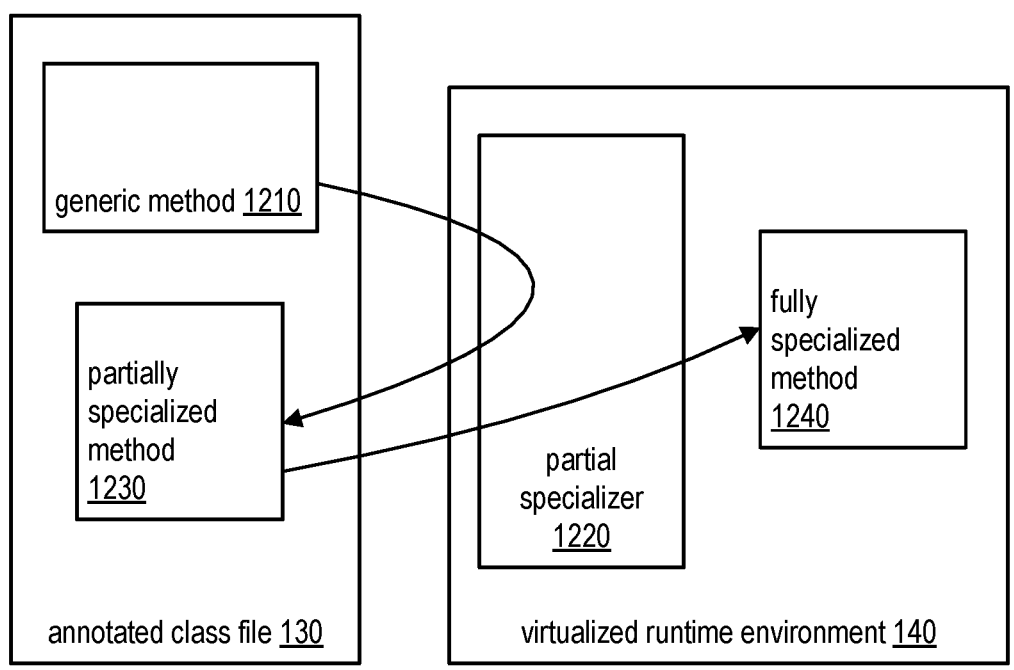
FIG. 12 is a logical block diagram illustrating the partial specialization of a generic class, according to one embodiment.

Generic methods may have more than one specializable type parameter, such as in the example, makeMap (K, V). It may be desirable to specialize one or more of the type variables while not specializing others, (e.g. leaving others generic). FIG. 12 is a logical block diagram illustrating the partial specialization of a generic method, according to one embodiment. A specializer, such as partial specializer 1220 of virtualized runtime environment 140, may be configured to partially specialize generic method 1210 to produce partially specialized method 1230 and may also be configured to subsequently further specialize partially specialized method 1230 to generate fully specialized method 1240, according to some embodiments.

For example, generic method 1210 may represent the generic method makeMap (K, V) and partial specializer 1220 may be configured to specialized generic method 1210 to a makeMap method with a generic key parameter but with an int value parameter, such as makeMap (K, int). Alternatively, the generic method makeMap (K, V) may be specialized to a map with an int key parameter but with a generic value parameter, such as in makeMap (int, V). This may be referred to herein as "partial specialization".

In some embodiments, the result of partial specialization may be one or more additional generic methods that are further specializable on the remaining type parameters. For example, partially specialized method 1230 may represent makeMap (K, int) and may be further specializable to generate fully specialized method 1240 which may represent one or more maps with particular types for the keys, such as makeMap (int, int) or makeMap (long, int). In other words, for a generic method with more than one type variable, such as makeMap (K, V), one of the type variables may be specialized, such as makeMap (int, V), while not specializing the other type variable(s). The resulting generic method may be considered a partially specialized method that can be specialized further. Additionally, the resulting generic method may also be used directly as a partially specialized method, thus allowing a user (e.g., developer) to mix specialization and erasure as desired.

Thus, rather than performing the specialization of a generic method all at once, such as by specializing makeMap (K, V) into makeMap (int, int) or makeMap (long, int), one type parameter may be partially specialized, such as resulting in makeMap (K, int), and then at some later time the remaining type parameter(s) may be specialized, such as to generate makeMap (int, int) or makeMap (long, int). In some embodiments, the partial specialization may occur at compile time while the subsequent full specialization may not occur until runtime, such as when the method is first invoked.

Thus, partial specialization may refer in any of various combinations of specializations, according to various embodiments. For example, a single generic method may be partially specialized. Additionally, partial specialization may include the specialization of a generic method that is part of a partially specialized class (e.g., a generic instance method). Furthermore, a generic method (e.g., an instance method) that is part of a partially specialized class may be itself be partially specialized.

While illustrated in FIG. 12 as storing the partially specialized method 1230 back to the annotated class file 130, in some embodiments, the partially specialized method 1230 may be stored in a different location, such as within a separate class file or in memory within virtualized runtime environment 140, among other locations.

Figure 13:
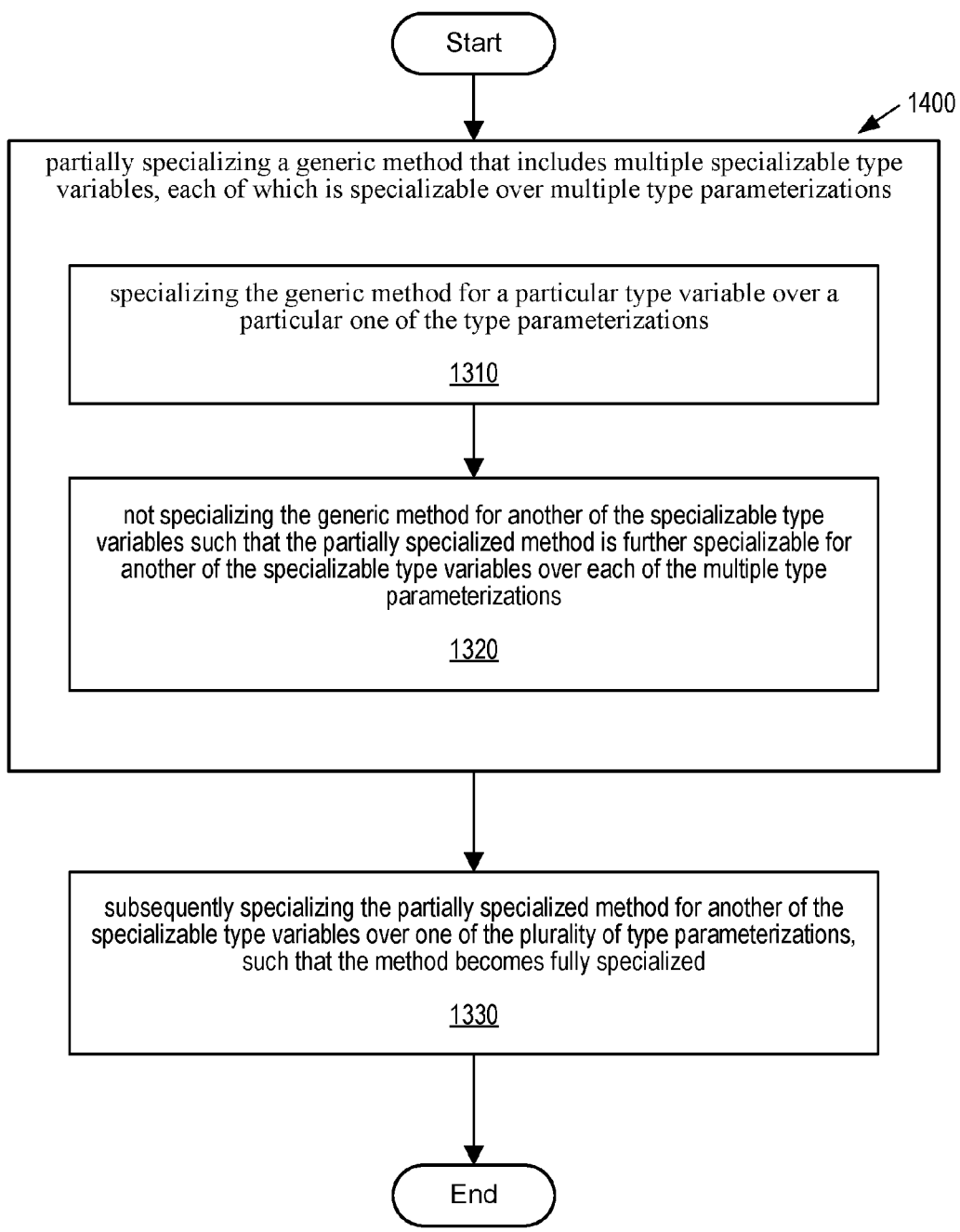
FIG. 13 is a flowchart illustrating one embodiment of a method for partial specialization of generic classes, as described herein.

FIG. 13 is a flowchart illustrating one embodiment of a method for partial specialization of generic methods, as described herein. As shown in block 1300, a generic method may be partially specialized. The generic method may include multiple specializable type variables, each of which may be specializable over multiple type parameterizations, according to one embodiment.

As shown in blocks 1310 and 1320, partially specializing the generic method may involve specializing the generic method for a particular one of the multiple type variables over a particular one of the multiple type parameterizations, as shown in block 1310, and not specializing the generic method for another of the specializable type variables, as shown in block 1320, such that the partially specialized method is further specializable for at least one other of the multiple specializable type variables for each of the multiple type parameterizations.

For example, makeMap (K, V) { . . . } may be partially specialized for one type variable, such as K, without specializing the other type variable, V. Additionally, MakeMap (int, V) may be a partial specialization of makeMap (K, V). Only one of makeMap's type variables (e.g., K) has been specialized, thus allowing makeMap (int, V) to be further specialized for V over any (or all) of the type parameterizations over which makeMap may be specializable. In some embodiments, the partially specialized method may be further specializable over each of the plurality of possible type parameterizations for which the method is specializable. Thus, after being partially specialized for K=int, as in the above example, the partially specialized makeMap (int, V) may be further specializable for V over other type parameterizations, such as for V=long, V=boolean, v=String, etc., according to various embodiments. In some embodiments, a parameterized type, such as makeMap (int, V), may be recognized as a partial parameterization of a generic method, such as makeMap (K, V), and the generic method may be partially specialized to form another generic method (e.g., Map<int, v>) allowing a parameterized type to be formed.

As shown in block 1330, the partially specialized method may then be subsequently further specialized for another of the specializable type variables such that the partially specialized method becomes fully specialized. Continuing the above example, the partially specialized makeMap (int, V) may be further specialized for the remaining type variable (e.g., v) to become makeMap (int, int).

Thus, makeMap (int, v) may be further specialized for v=int (as one example), resulting in a makeMap (int, int), according to one example embodiment. Additionally, after being further specialized over one type parameterization, the same partially specialized method may be further specialized over other type parameterizations. For example, the same partially specialized makeMap (int, V) method may be further specialized for V=long, resulting in makeMap (int, long).

In some embodiments, partial specialization of a method may be accomplished by partially specializing metadata injected into the method (e.g., in order for the method to be specializable) and then propagating the partially specialized metadata into the new, partially specialized, method as part of the class file so that the result of the partial specialization is re-specializable. Thus, partial specialization may be accomplished by forward-propagating a projection of specialization metadata from the original method into the result of the partial specialization, according to some embodiments.

As described herein, specializing generic methods may be performed for various reasons. For instance, specializing a generic method may result in better performance (e.g., operations on integers are generally faster than operations on objects) and secondly, a generic method may be specialized to take advantage of particular information regarding the arguments (e.g., such as to add new functionality that is only appropriate to certain type parameters).

Thus, it may be beneficial to have a partially specialized makeMap method where the keys are ints even if nothing about the values are known, such as makeMap (int, V). This partially specialized method may then be specialized to use particular map values without having to specialize the entire method, such as since makeMap (K, V) was already partially specialized to makeMap (int, V).

In some embodiments, partially specialized classes may be declared explicitly, such as in the following example code:
   static<any V>Map<int, V>makeMap(int, V) {—}
Alternatively, multiple different partial specializations, such as makeMap (int, V), or makeMap (K, int), may be automatically generated (e.g., by the runtime environment) that are themselves specializable as needed whenever a user of the particular type occurs. Thus, there may be multiple, different partial specifications and they may appear anywhere than the specializable generic method could occur.

Furthermore, in some embodiments partial specialization may be combined with dependency-driven co-specialization. For example, a generic method may include multiple generic type variables and may be partially specialized to generate a partially specialized method. Additionally, another generic method may be dependent on the first generic method, as defined by a dependency relationship. Thus, when the first generic method is partially specialized the second generic method may also be (partially or fully) specialized based on the dependency relationship between the two methods.

A partially specialized method may be further specialized to generate a fully specialized method, which may also trigger the further specialization of other partially specialized methods, according to some embodiments.

Wholesale Replacement of Generic Methods

Figure 14:
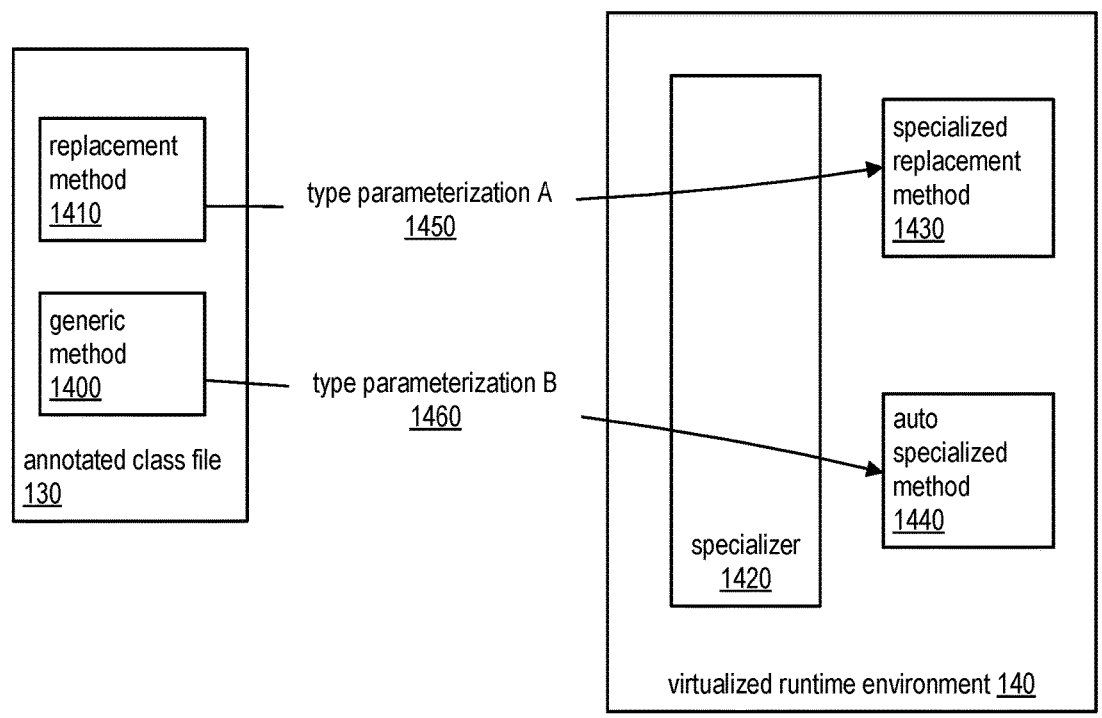
FIG. 14 is a logical block diagram illustrating wholesale replacement of generic methods, according to one embodiment.

Additionally, standard (or automatic) specialized generic methods may be replaced by handwritten version of the specialized method. FIG. 14 is a logical block diagram illustrating wholesale replacement of specialized generic methods, according to one embodiment.

An automatic (e.g., dynamically) specialized version of a generic method may be used for most types, but when the method is specialized for particular types, the handwritten version of the method may be used instead. Thus, when a generic method, such as a generic method in a non-generic class, is specialized for a particular type, an alternate version of the method may be used, in some embodiments. As shown in FIG. 14, annotated class file 130 may include a generic method 1400 as well as a replacement method 1410. Replacement method 1410 may correspond to particular type parameterizations and may be intended to replace generic method 1400 when generic method 1400 is specialized for those particular type parameterizations. In some embodiments, a replacement method, such as replacement method 1410, may represent (e.g., may be) a hand-written or otherwise manually generated (e.g., rather than automatically generated by a compiler, specializer, class loader, etc.) replacement method representing a specialization of the generic method for a particular parameterization.

In some embodiments, a single class file may describe (e.g. include) both a generic version of a method and then override that generic version in one or more instantiation-specific layers. For example, a single class (e.g., in an annotated class file) may include both the generic version of the method and one or more alternate versions of the method for particular type parameterizations.

Returning to our makeList static method example:

```
static<any T> List<T> makeList(T... ts) {
    List<T> list = new ArrayList<T>( );
    for (T t : ts)
        list.add(t);
    return list;
}
```

As one example, a specific, hand-written, specialization for integers may be used. The following example code illustrates a range of inputs and uses a List<short> or List<byte> where practical (e.g., to save space):

```
< where T=int>
static List<int> makeList(int... ts) {
    int max = 0;
    for (int i : ts) {
        int absT = Math.abs(t);
        if (absT > max)
            max = absT;
    }
    if (absT < 256) {
        List<byte> list = new ArrayList<byte>( );
        for (int t : ts)
            list.add((byte) t);
        return asUmodifiableIntList(list);
    }
    else if (absT < 65536) {
        List<short> list = new ArrayList<short>( );
        for (int t : ts)
            list.add((short) t);
        return asUmodifiableIntList(list);
    }
    else {
        List<int> list = new ArrayList<int>( );
        for (int t : ts)
            list.add(t);
        return asUmodifiableIntList(list);
    }
}
```

In the above example, specialization information (e.g., metadata) may be stored (e.g., such as in the template containing the method to be specialized) that indicates that if the specialization parameter for the method is 'T=int' use the particular hand-written version should be used. Thus, in addition to being able to specialize this method (e.g., dynamically), particular hand-written versions of the specialized method for particular type parameterizations may also be used.

For instance, when generic method 1400 is specialized for a type parameterization A 1450 to which replacement method 1410 corresponds, specializer 1420 may load, invoke and execute specialized replacement method 1430 instead of an auto specialized version of generic method 1400. Alternatively, when generic method 1400 is specialized for a different type parameterization, such as type parameterization B 1460, to which replacement method 3310 does not correspond, the specializer may load and specialize generic method 1400, as represented by auto specialized method 1440.

Thus, if a developer writes different versions of a generic method, the different, hand-written, versions may be propagated by the compiler into the class file and at runtime, a particular version of the method may be loaded based upon the particular type parameters being specialized. In some embodiments, determining whether to use a hand-written version may be performed at the same time as which the determination of whether a previously specialized version (e.g., either specialized at build-time, or cached from a previous dynamic specialization) of the same method is made.

In some embodiments, the bootstrap method (e.g., provided to the invokedynamic instruction) may be used to perform the actual wholesale replacement. The bootstrap method may find the handwritten method in the template (e.g., the annotated class declaration within the annotated class file) based on the specialization metadata in the template class. The bootstrap method may then create a method handle for the replacement method (e.g., after loading the replacement method if it wasn't already loaded) and return it to the virtualized runtime environment (e.g., via the invokedynamic instruction) as the linkage.

In some embodiments, the replacement method may be provided (e.g., may be hand written or manually generated by the developer) in the source code to be annotated by the compiler in the class file. Upon invocation of the generic method using invokedynamic, the bootstrap method may then recognize the specialization metadata when specializing the generic method, discover the replacement method, determine that the particular type parameterization matches that for which the replacement method is to be used, and, in response, use the replacement method rather an autospecialized version of the generic method. Alternatively, one or more parameters may be provided to the bootstrap method via the invokedynamic method that include information indicating that the replacement method should be used for the particular type parameterization, thereby allowing the bootstrap method to determine that the replacement method should be used.

Figure 15:
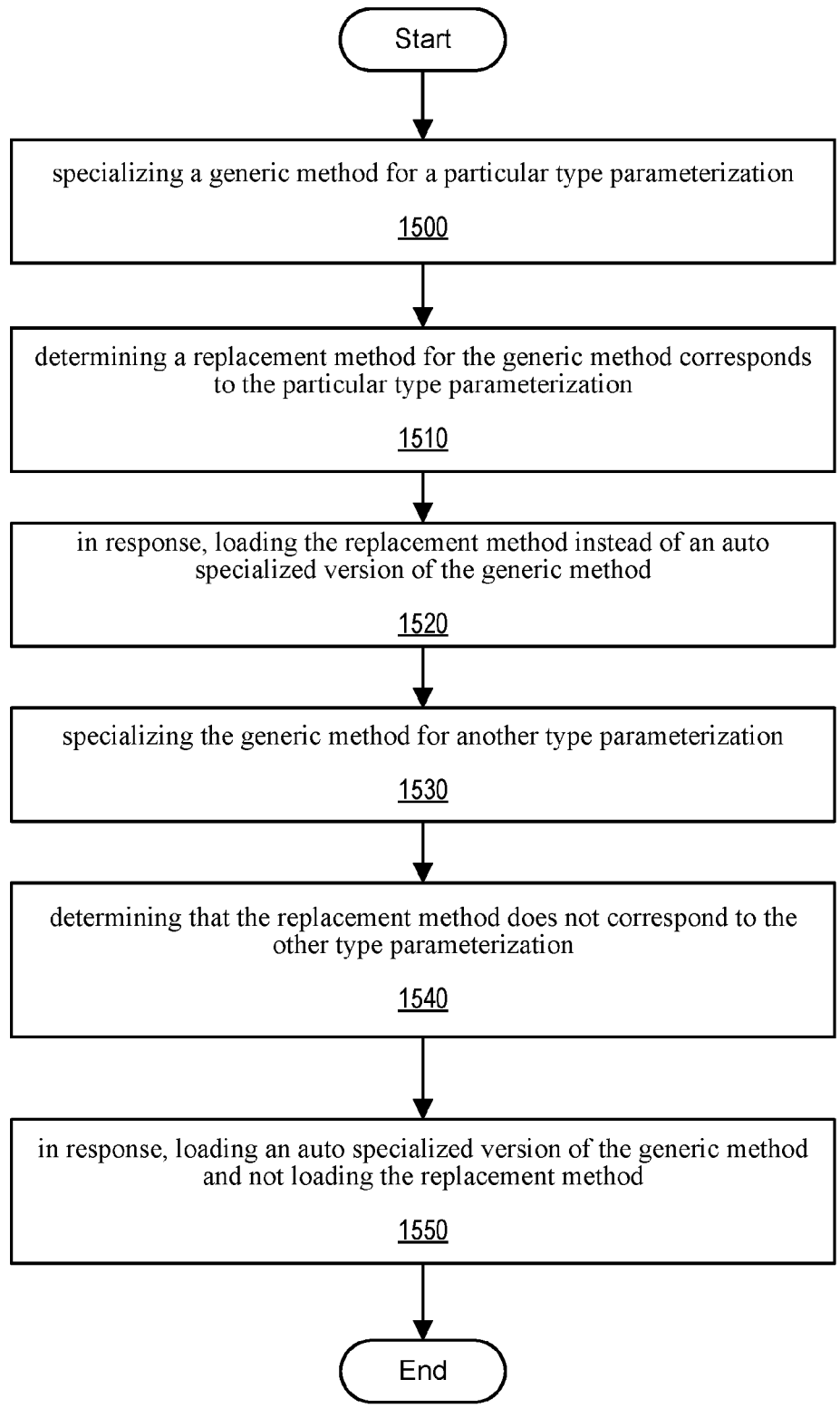
FIG. 15 is a flowchart illustrating one embodiment of a method for wholesale replacement of generic methods, as described herein.

FIG. 15 is a flowchart illustrating one embodiment of a method for manual refinement for generic methods, as described herein. As shown in block 1500, a generic method may be specialized for a particular type parameterization. For instance, a specializer may be configured to load and specialize a method for a particular type parameterization. Using the example above, a specializer may be configured to load and specialize the singletonList method for T=int. As shown in block 1510, the specializer may determine a replacement method for the generic method that corresponds to the particular type parameterization. For example, the specializer may determine that a replacement version of the singletonList method exists and corresponds to the type parameterization T=int.

As shown in block 1520, in response to determining that the replacement method corresponds to the particular type parameterization, the specializer may load the replacement method instead of loading an auto specialized version of the generic method, according to one embodiment. For example, the specializer may load the specialization<T=int> version of the singletonList method, instead of the auto specialized version of the singletonList.

Additionally, the generic method may be specialized for a another type parameterization, as shown in block 1530, and the specializer may determine that the replacement method does not correspond to the other type parameterization, as shown in block 1540. For example, the singletonList method from the example above may be specialized for a type parameterization other than T=int and therefore the specializer may determine that the replacement method (e.g., the specialization<T=int> version) does not correspond to the other type parameterization. In response, the specializer may not load the specialization<T=int > version of the singletonList method, but instead may load an auto specialized version of the singletonList method, as shown in block 1550, according to one embodiment.

In some embodiments, a method for generic method specialization may include passing a generic method and specialization metadata to a specialized method generator. The specialization metadata may include information identifying one or more program elements of the generic method to be adjusted when specializing the generic method for a particular type parameterization. The specialized method generator may, in response, generate a specialized method based on the generic method and the specialization metadata. The specialized method may be a version of the generic method specialized for the particular type parameterization.

The method may also include storing a reference to the specialized method as a result of the specialized method being generated and such that the reference is usable to invoke the specialized method.

Another method for implementing generic method specialization may include a compiler generating a class file that includes a generic method declaration that includes one or more type variables. As part of generating the class file, the compiler may apply a type erasure to a stream of instructions in the generic method declaration. The stream of instructions may be configured for execution by a virtualized execution environment.

Applying the type erasure operation may include creating an encoded form of a program element of the generic method declaration. The encoded form may include metadata specifying specialization information regarding the program element such that the encoded form may be specialized by a virtualized execution environment according to a particular type parameterization. The encoded form of the program element may be included in the class file as part of applying the type erasure operation. The program element may be usable by the virtualized runtime environment to load the program element without regard to the metadata being present in the encoded form.

Example Computer System

Figure 16:
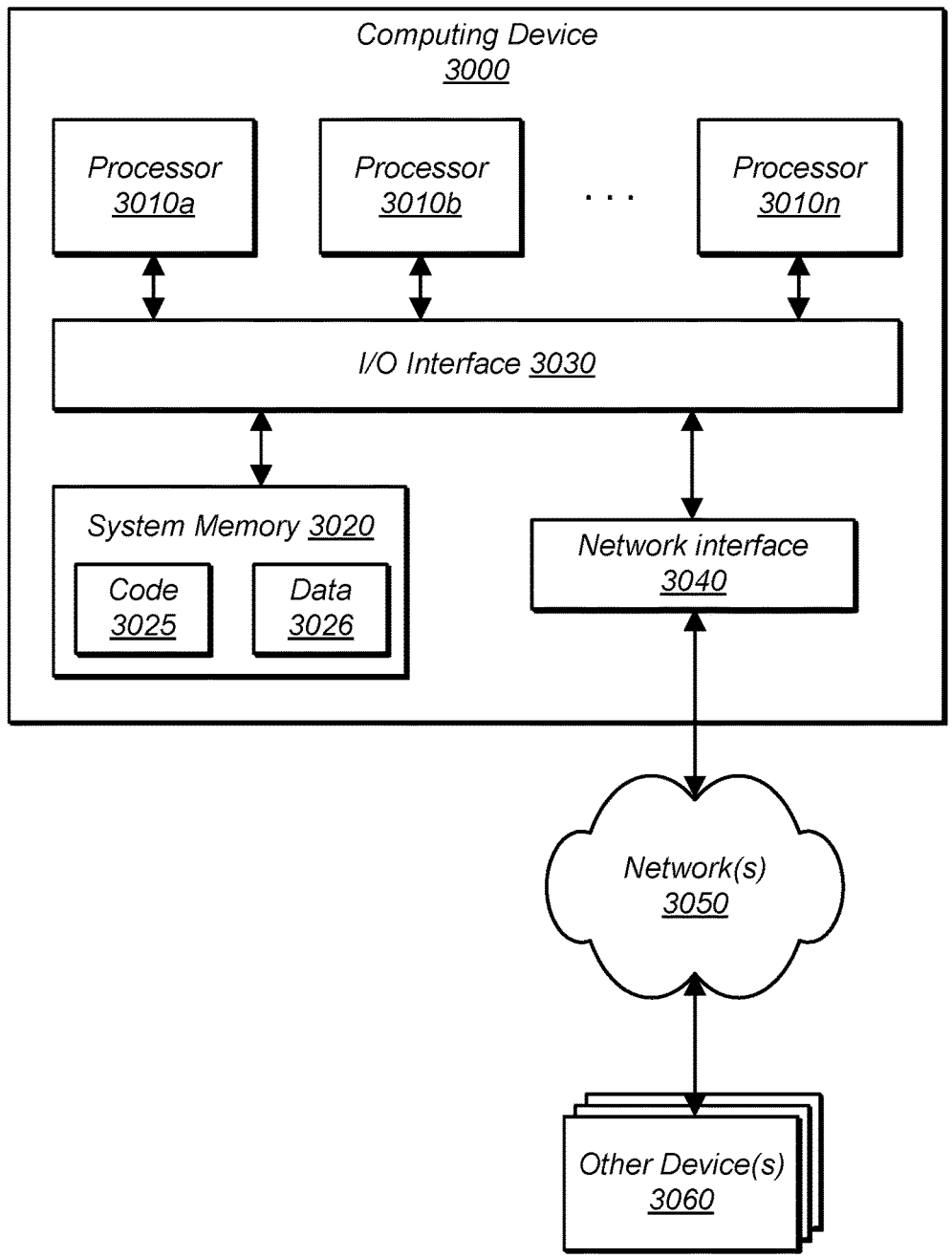
FIG. 16 is a logical block diagram illustrating an example computer system suitable for implementing generic method specialization, as in one embodiment.

In at least some embodiments, a computer system that implements a portion or all of one or more of the technologies described herein may include a general-purpose computer system that includes or is configured to access one or more computer-readable media. FIG. 16 illustrates such a general-purpose computing device 3000 suitable for implementing the methods, techniques, features and enhancements described herein. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026. For example, memory 3020 and well as code 3025 and data 3026 may store, in one embodiment, program instructions and data for implementing compiler 120 and/or virtualized runtime environment 140, described above.

In various embodiments, compiler 120 and/or virtualized runtime environment 140 (and/or any individual sub-modules thereof) may each be implemented in any of various programming languages. For example, in one embodiment, compiler 120 and/or virtualized runtime environment 140 may be written in any of the C, C++, assembly, Java™ or other general purpose programming languages, while in another embodiment, one or more of them may be written using a different, more specialized, programming language. Moreover, in some embodiments, compiler 120 and/or virtualized runtime environment 140 (and/or various sub-modules thereof) may not be implemented using the same programming language.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example.

In some embodiments, system memory 3020 may be one embodiment of a computer-readable (e.g., computer-accessible) medium configured to store program instructions and data as described above with respect to FIGS. 1-15 for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory.

Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 16 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software, hardware, or a combination thereof. In various of the methods, the order of the steps may be changed, and various elements may be added, reordered, combined, omitted, modified, etc. Various of the steps may be performed automatically (e.g., without being directly prompted by user input) and/or programmatically (e.g., according to program instructions).

While various systems and methods have been described herein with reference to, and in the context of, specific embodiments, it will be understood that these embodiments are illustrative and that the scope of the disclosure is not limited to these specific embodiments. Many variations, modifications, additions, and improvements are possible. For example, the blocks and logic units identified in the description are for understanding the described embodiments and not meant to limit the disclosure. For example, actions, processes, methods, tasks or functions described herein as being performed by Compiler 120 may, in some embodiments, be performed by virtualized runtime environment 140 and vice versa. Additionally, functionality may be separated or combined in blocks differently in various realizations of the systems and methods described herein or described with different terminology.

These embodiments are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of examples that follow. Finally, structures and functionality presented as discrete components in the exemplary configurations may be implemented as a combined structure or component.

Although the embodiments above have been described in detail, numerous variations and modifications will become apparent once the above disclosure is fully appreciated. It is intended that the following claims be interpreted to embrace all such variations and modifications.

What is claimed is:

1. A non-transitory, computer-readable storage medium storing program instructions that when executed on a computing device cause the computing device to perform:
    passing a generic method and specialization metadata to a specialized method generator, wherein the specialization metadata comprises information identifying one or more program elements of the generic method to be adjusted when specializing the generic method for a particular type parameterization;
    generating, by the specialized method generator in response to said passing, a specialized method based, at least in part, on the generic method and the specialization metadata, wherein the specialized method is a version of the generic method specialized for the particular type parameterization; and
    storing, as a result of the specialized method being generated, a handle to the specialized method, such that the handle is usable to invoke the specialized method.

2. The non-transitory, computer-readable storage medium of claim 1, wherein said passing, said generating and said storing are performed in response to an invocation of the generic method during runtime of an application in a virtualized runtime environment.

3. The non-transitory, computer-readable storage medium of claim 2, wherein said passing, said generating and said storing are performed in response to determining that the generic method has not been invoked previously for the particular type parameterization.

4. The non-transitory, computer-readable storage medium of claim 1, wherein said storing comprises storing the handle to the specialized method in a cache configured to store handles to specialized methods.

5. The non-transitory, computer-readable storage medium of claim 4, wherein the program instructions further cause the computing device to perform:
    retrieving the handle to the specialized method from the cache in response to a subsequent invocation of the generic method for the particular type parameterization; and
    invoking the generic method using the retrieved handle.

6. The non-transitory, computer-readable storage medium of claim 1, wherein the program instructions further cause the computing device to perform:
    generating a container class, wherein said generating comprises generating the specialized method as a member of the container class;
    storing the specialized method; and
    treating the specialized method as if it were a member of a class to which the generic method is a member.

7. The non-transitory, computer-readable storage medium of claim 1, wherein said generating comprises:
    determining that a class to which the generic method is a member also comprises a manually generated replacement method representing a specialization of the generic method for the particular type parameterization; and
    loading the manually generated replacement method as the specialized method.

8. The non-transitory, computer-readable storage medium of claim 1, wherein said generating comprises specializing another generic method in response to determining a dependency relationship between the generic method and the other generic method.

9. The non-transitory, computer-readable storage medium of claim 1, wherein the generic method comprises a plurality of specializable type variables, wherein each of the plurality of specializable type variables are specializable over a plurality of type parameterizations, and wherein the generic method was previously partially specialized such that one of the plurality of specializable type variables was specialized for one of the plurality of type parameterizations, and wherein said generating comprises specializing another of the plurality of specializable type variables over the particular type parameterization.

10. A method, comprising:
    passing, by a platform-independent, object-oriented, runtime environment implemented on one or more computing devices comprising one or more hardware processors and memory, a generic method and specialization metadata to a specialized method generator of the platform-independent, object-oriented, runtime environment, wherein the specialization metadata comprises information identifying one or more program elements of the generic method to be adjusted when specializing the generic method for a particular type parameterization;

generating, by the specialized method generator in response to said passing, a specialized method based, at least in part, on the generic method and the specialization metadata, wherein the specialized method is a version of the generic method specialized for the particular type parameterization; and storing, as a result of the specialized method being generated, a handle to the specialized method, such that the handle is usable to invoke the specialized method.

11. The method of claim 10, wherein said passing, said generating and said storing are performed in response to an invocation of the generic method during runtime of an application in the platform-independent, object-oriented, runtime environment.

12. The method of claim 11, wherein said passing, said generating and said storing are performed in response to determining that the generic method has not been invoked previously for the particular type parameterization.

13. The method claim 10, wherein said storing comprises storing the handle to the specialized method in a cache configured to store handles to specialized methods.

14. The method of claim 13, further comprising:
retrieving the handle to the specialized method from the cache in response to a subsequent invocation of the generic method for the particular type parameterization; and
invoking the generic method using the retrieved handle.

15. The method of claim 10, further comprising:
generating a container class, wherein said generating comprises generating the specialized method as a member of the container class;
storing the specialized method; and
treating the specialized method as if it were a member of a class to which the generic method is a member.

16. The method of claim 10, wherein said generating comprises:
determining that a class to which the generic method is a member also comprises a replacement method representing a specialization of the generic method for the particular type parameterization; and
loading the replacement method as the specialized method.

17. The method of claim 10, wherein said generating comprises specializing a generic class in response to determining a dependency relationship between the generic method and the generic class.

18. The method of claim 10, wherein the generic method comprises a plurality of specializable type variables, wherein each of the plurality of specializable type variables are specializable over a plurality of type parameterizations, and wherein the generic method was previously partially specialized such that one of the plurality of specializable type variables was specialized for one of the plurality of type parameterizations, and wherein said generating comprises specializing another of the plurality of specializable type variables over the particular type parameterization.

19. A non-transitory, computer-readable storage medium storing program instructions that when executed on a computing device cause the computing device to perform:
generating, by a compiler, a class file comprising a generic method declaration, wherein said generating comprises:
applying a type erasure operation to a stream of instructions in the generic method declaration, wherein the stream of instructions is configured for execution by a virtualized runtime environment, and wherein the generic method declaration includes one or more type variables;
wherein applying the type erasure operation comprises:
creating an encoded form of a program element of the generic method declaration, wherein the encoded form of the program element comprises metadata specifying specialization information regarding the program element such that the encoded form can be specialized by the virtualized runtime environment according to a particular type parameterization; and
including the encoded form of the program element in the class file, wherein the program element is usable by the virtualized runtime environment to load the program element without regard to the metadata being present in the encoded form.

20. The non-transitory, computer-readable storage medium of claim 19, wherein the encoded form of the program element comprises a bytecode version of the stream of instructions, and wherein the metadata in the encoded form identifies one or more bytecodes to be adjusted to generate a specialized version of a method based on the generic method declaration.

* * * * *

UNITED STATES PATENT AND TRADEMARK OFFICE
CERTIFICATE OF CORRECTION

PATENT NO. : 9,891,900 B2
APPLICATION NO. : 15/055469
DATED : February 13, 2018
INVENTOR(S) : Goetz et al.

Page 1 of 1

It is certified that error appears in the above-identified patent and that said Letters Patent is hereby corrected as shown below:

On the Title Page

On page 3, Column 2, under Other Publications, Line 5, delete "Gererics" and insert -- Generics --, therefor.

In the Drawings

On sheet 6 of 16, in FIG. 6, under Reference Numeral 600, Line 1, delete "invokedyanmic" and insert -- invokedynamic --, therefor.

In the Specification

In Column 12, Line 39, delete "aload_I," and insert -- aload_1, --, therefor.

In Column 12, Line 60, delete "aload_I" and insert -- aload_1 --, therefor.

In Column 13, Line 4, delete "aload_I" and insert -- aload_1 --, therefor.

In Column 24, Line 55, delete "specialized," and insert -- specialized. --, therefor.

In the Claims

In Column 37, Line 25, in Claim 13, after "method" insert -- of --.

Signed and Sealed this
Fourteenth Day of August, 2018

Andrei Iancu
*Director of the United States Patent and Trademark Office*